United States Patent
Oguchi et al.

(10) Patent No.: US 10,264,144 B2
(45) Date of Patent: Apr. 16, 2019

(54) ELECTRONIC DEVICE

(71) Applicant: FUJITSU COMPONENT LIMITED, Tokyo (JP)

(72) Inventors: Tatsuya Oguchi, Tokyo (JP); Sumio Watanabe, Tokyo (JP); Yukihiro Mori, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/922,109

(22) Filed: Mar. 15, 2018

(65) Prior Publication Data

US 2018/0288244 A1 Oct. 4, 2018

(30) Foreign Application Priority Data

Mar. 30, 2017 (JP) .................. 2017-068080

(51) Int. Cl.
*G06F 3/12* (2006.01)
*H04N 1/00* (2006.01)
*B41J 3/36* (2006.01)

(52) U.S. Cl.
CPC .......... *H04N 1/00209* (2013.01); *B41J 3/36* (2013.01); *H04N 1/00206* (2013.01); *H04N 1/00312* (2013.01); *G03G 2215/00983* (2013.01)

(58) Field of Classification Search
CPC .......... H04N 1/00209; H04N 1/00206; H04N 1/00312; G03G 2215/00983
USPC ........................................ 358/1.15
See application file for complete search history.

(56) References Cited

U.S. PATENT DOCUMENTS

| | | | | |
|---|---|---|---|---|
| 5,535,010 A | * | 7/1996 | Izumi | B41J 3/36 347/222 |
| 6,814,515 B2 | | 11/2004 | Tsuchiya et al. | |
| 2006/0078365 A1 | * | 4/2006 | Choh | B41J 29/02 400/693 |
| 2009/0027698 A1 | * | 1/2009 | Velner | H04N 1/0607 358/1.1 |
| 2009/0091597 A1 | * | 4/2009 | Silverbrook | B41J 2/01 347/29 |

FOREIGN PATENT DOCUMENTS

JP 2003-019845 1/2003

* cited by examiner

*Primary Examiner* — Neil R McLean
(74) *Attorney, Agent, or Firm* — IPUSA, PLLC

(57) ABSTRACT

An electronic device includes a power unit that accommodates a battery; a communication unit that wirelessly communicates with an external device; and a printer unit that prints print data obtained by the communication unit on a recording paper, wherein an outer appearance of the electronic device is a cylindrical shape.

5 Claims, 41 Drawing Sheets

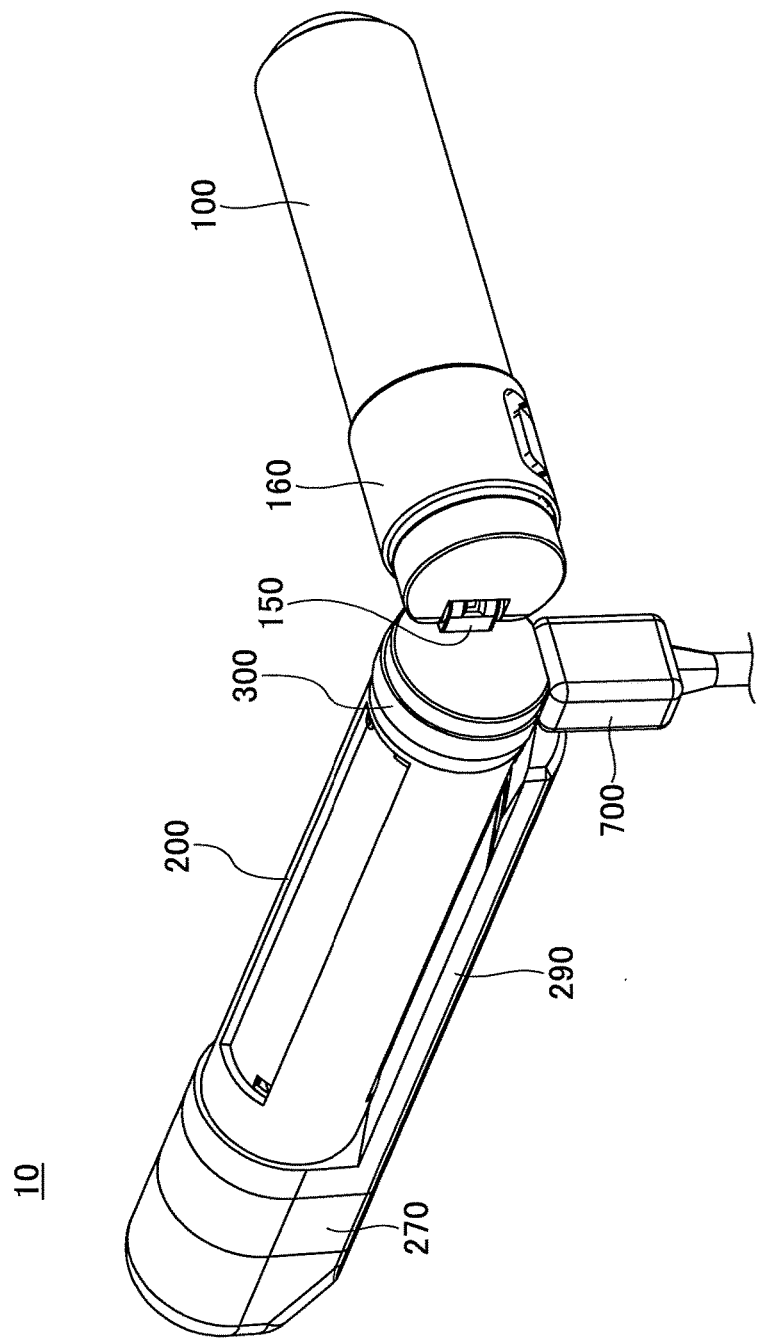

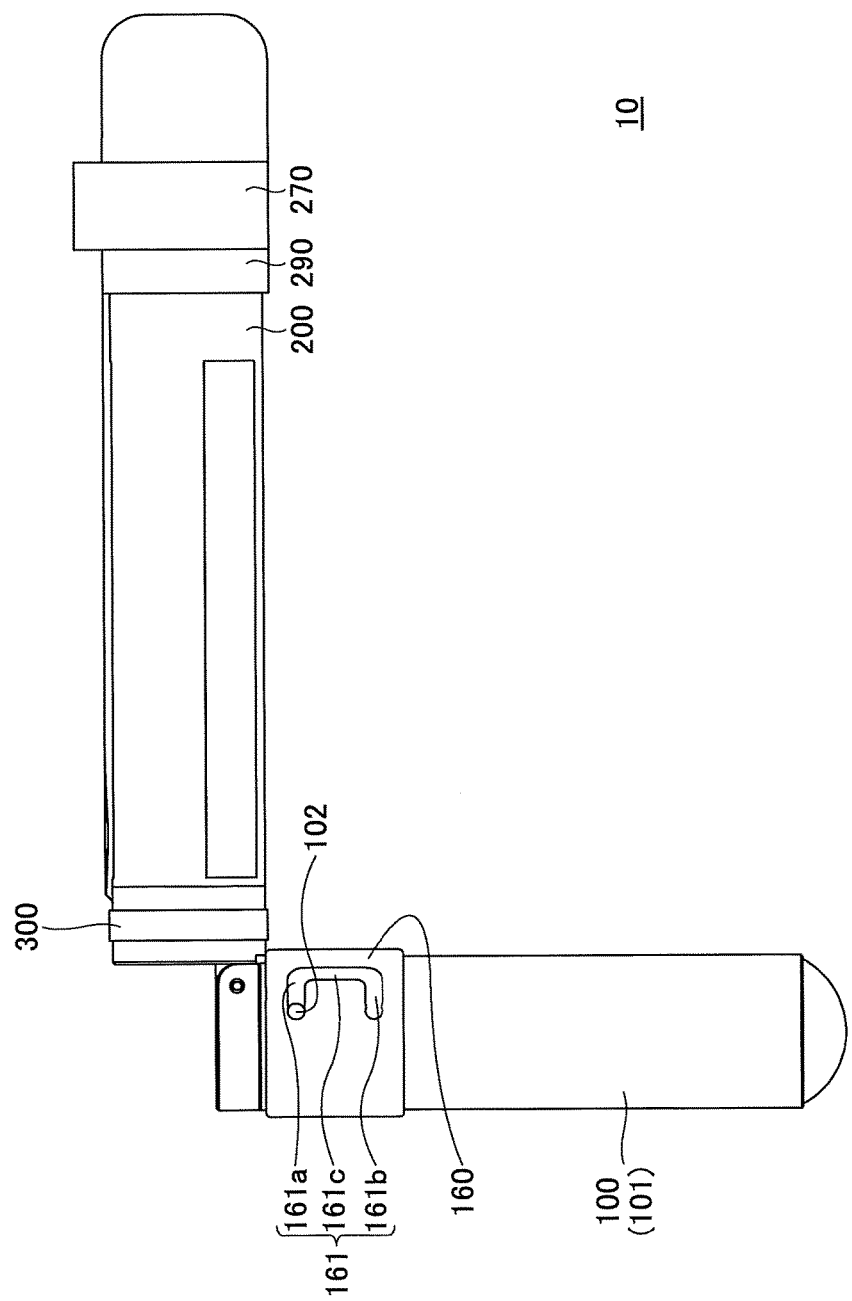

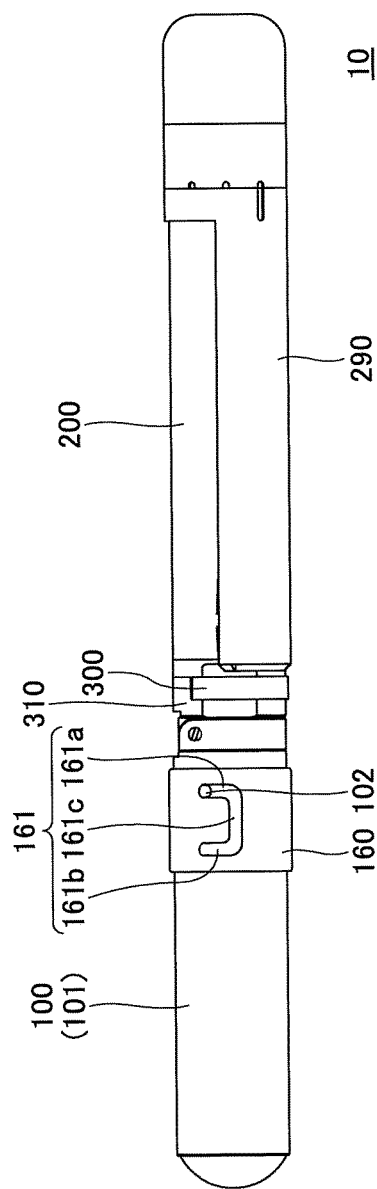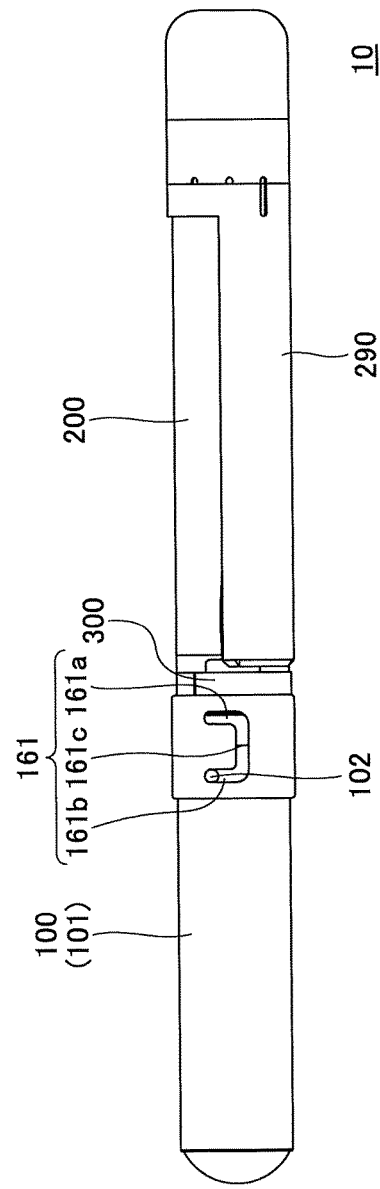
FIG.5A
FIG.5B

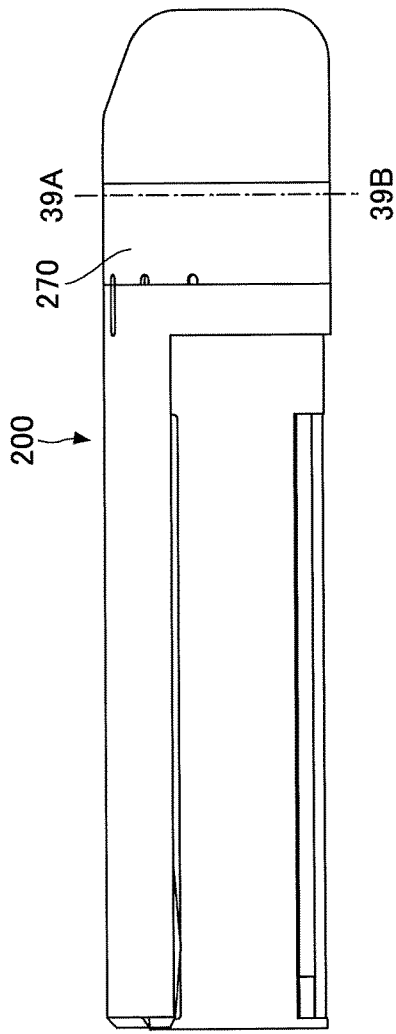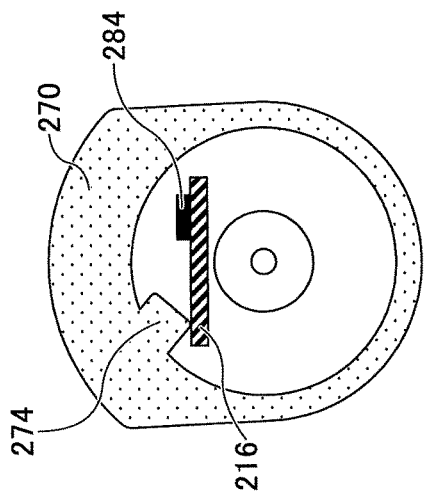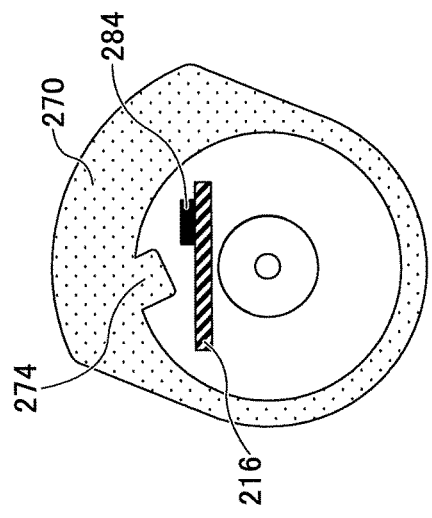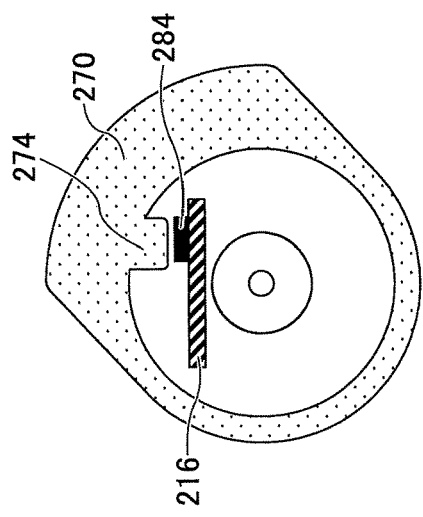

ELECTRONIC DEVICE

CROSS-REFERENCE TO RELATED APPLICATION

The present application is based on and claims the benefit of priority of Japanese Priority Application No. 2017-068080 filed on Mar. 30, 2017, the entire contents of which are hereby incorporated by reference.

BACKGROUND OF THE INVENTION

1. Field of the Invention

The present invention relates to an electronic device.

2. Description of the Related Art

Conventionally, a portable printer is used for printing on a recording paper. However, such a portable printer has a box-like shape, is relatively large, and is put in a bag when carrying the printer. Further, a mobile device may be used to manage a movement line of a user by a wireless communication.

As such a printer is carried in a bag, if the user moves while leaving the bag, the movement line of the user cannot be accurately managed.

Thus, a portable printer is required to be a small size, and to have a shape that is easy to carry.

PATENT DOCUMENT

Patent Document 1: Japanese Laid-open Patent Publication No. 2003-19845

SUMMARY OF THE INVENTION

According to an embodiment, there is provided an electronic device including a power unit that accommodates a battery; a communication unit that wirelessly communicates with an external device; and a printer unit that prints print data obtained by the communication unit on a recording paper, wherein an outer appearance of the electronic device is a cylindrical shape.

BRIEF DESCRIPTION OF THE DRAWINGS

Other objects, features and advantages of the present invention will become more apparent from the following detailed description when read in conjunction with the accompanying drawings.

FIG. 3 is a view for describing the electronic device of the embodiment;

FIG. 4 is a view for describing the electronic device of the embodiment;

FIG. 5A and FIG. 5B are views for describing a reinforcing ring of the embodiment;

FIG. 39A to FIG. 39D are views for describing a sensor of the electronic device;

DESCRIPTION OF THE EMBODIMENTS

Figure 1:
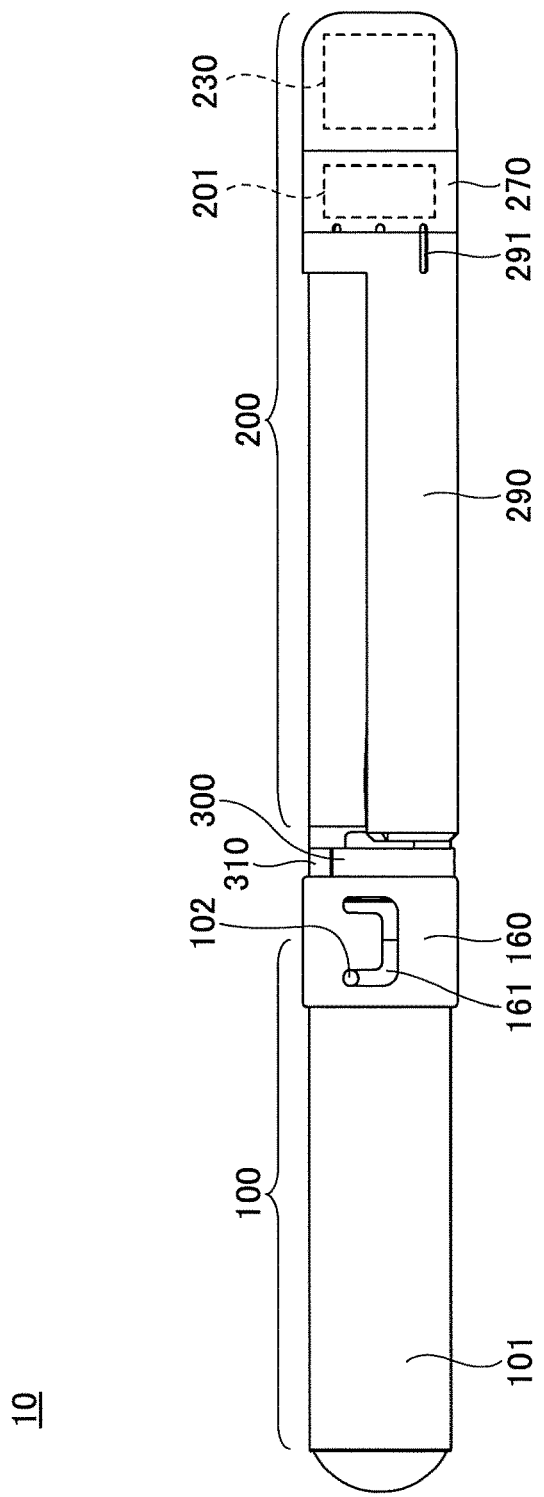
FIG. 1 is a view illustrating a structure of an electronic device of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, the same components are given the same reference numerals, and explanations are not repeated.

An electronic device of the embodiment is an IoT (Internet of Things) device including a printer function and a wireless communication function. The wireless communication is performed by a BLE (Bluetooth Low Energy) or the like, and the wireless communication may be used for detecting positional information or the like in addition to transmitting print data.

(Structure of Electronic Device)

FIG. 1 to FIG. 5B are views illustrating a structure of an electronic device 10 of the embodiment.

As illustrated in FIG. 1, the electronic device 10 has a cylindrical shape, and includes a power unit 100, a communication unit that wirelessly communicates with an external device, and a printer unit 200 that prints the obtained print data on a recording paper. The communication unit includes an antenna 201 and a wireless communication circuit 520, which will be described later.

The electronic device 10 further includes a cylindrical ring 160, a case 310, a power source operation knob 300, an outer cover operation knob 270 and a hook 290.

The case 310 is connected to an inner cover 250 of the printer unit 200, which will be described later. The knob 300 is provided at the printer unit 200 near the power unit 100. The knob 300 is attached so as to rotate around the case 310.

It is preferable that a diameter of the electronic device 10 is less than or equal to 20 mm, and a length of the electronic device 10 is less than or equal to 200 mm, so that the electronic device 10 can be carried without feeling stress or the like. For example, a diameter of the electronic device 10 is approximately 16 mm and a length of the electronic device 10 is approximately 176 mm. Thus, it is easy to carry the electronic device 10. Further, the hook 290 is provided at the printer unit 200 so that the electronic device 10 can be carried while being inserted in a chest pocket or the like of clothes, similarly as a pen.

As illustrated in FIG. 3, the power unit 100 and the printer unit 200 are connected by a connection unit 150. The connection unit 150 can be bent as its axis. Further, a hinge spring is provided in the connection unit 150. The hinge spring provided can easily retain the position of the electronic device 10 under a state that the electronic device 10 is bent as illustrated in FIG. 3. In FIG. 3, a USB plug 700 of a battery charger is connected to the electronic device 10, and the electronic device 10 is charged.

Figure 2:
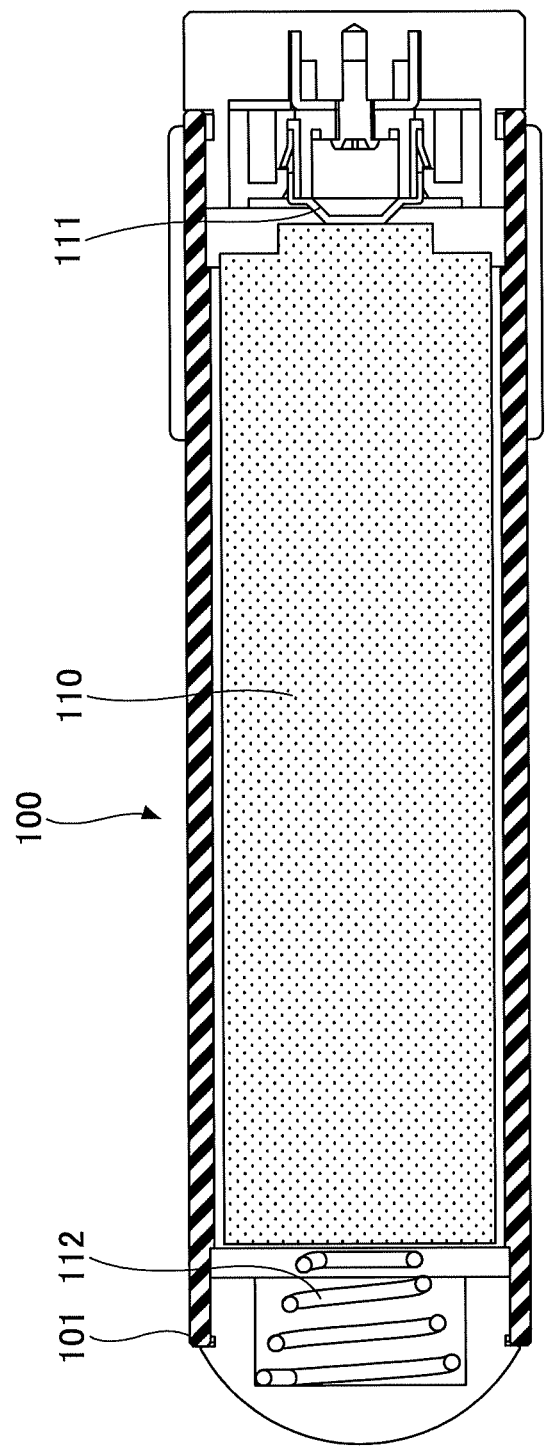
FIG. 2 is a view illustrating a structure of a power unit of the embodiment.

As illustrated in FIG. 2, the power unit 100 accommodates a battery 110. The battery 110 may be a rechargeable battery such as a lithium ion battery. The battery 110 is introduced in a cylindrical housing 101 of the power unit 100. A cathode of the battery 110 is connected to a cathode terminal 111 provided near the connection unit 150, and an anode of the battery 110 is connected to an anode terminal 112 that is provided with a spring. The anode terminal 112 is connected to a circuit in the printer unit 200 via an electrically conductive inner wall of the housing 101. A wiring from the cathode terminal 111 and a wiring from the anode terminal 112 are electrically insulated at a connection portion of the power unit 100 and the printer unit 200.

In this embodiment, as illustrated in FIG. 1, the power unit 100 and the printer unit 200 are linearly aligned. In order to retain the state in which the power unit 100 and the printer unit 200 are linearly aligned, the ring 160 is provided for preventing the connection unit 150 from being bent. The ring 160 is provided at the power unit 100. As illustrated in FIG. 4, a U-shaped groove 161 is provided at a side surface of the ring 160. The groove 161 includes a first groove 161a and a second groove 161b that are formed to extend along a circumferential direction of the ring 160, and a connection groove 161c that connects the first groove 161a and the second groove 161b. The first groove 161a is provided at a printer unit 200 side of the ring 160, and the second groove 161b is provided at a side further from the printer unit 200 than the first groove 161a. Further, a protrusion 102 is provided at an outer surface of the housing 101 introduced in the groove 161.

As illustrated in FIG. 4, when the power unit 100 and the printer unit 200 are bent at the connection unit 150, the ring 160 is positioned at the power unit 100 side with respect to a connection position of the power unit 100 and the printer unit 200. At this time, the protrusion 102 is positioned in the first groove 161a.

In order to linearly align the power unit 100 and the printer unit 200 as illustrated in FIG. 5A, the connection unit 150 is bent. Then, the ring 160 is rotated upwardly until the protrusion 102 is positioned at an intersection of the first groove 161a and the connection groove 161c.

Thereafter, the ring 160 is moved rightward in FIG. 5A to move the protrusion 102 in the connection groove 161c toward the printer unit 200 until the protrusion 102 is positioned at an intersection of the connection groove 161c and the second groove 161b. Under this state, as the connection portion of the power unit 100 and the printer unit 200 is covered by the ring 160, the power unit 100 and the printer unit 200 are not bent at the connection unit 150.

Thereafter, as illustrated in FIG. 5B, the ring 160 is rotated downwardly until the protrusion 102 is positioned at an end of the second groove 161b that is an opposite of the intersection of the connection groove 161c and the second groove 161b. With this, the state in which the power unit 100 and the printer unit 200 are linearly positioned can be retained. With this, the electronic device 10 is prevented from being bent at the connection unit 150 when carrying the electronic device 10. FIG. 5B illustrates a state of the electronic device 10 same as that illustrated in FIG. 1.

(Operation of Power Source)

On-off operations of the power source in the electronic device 10 are described with reference to FIG. 6 to FIG. 11. By rotating the knob 300, the printer unit 200 can be switched between four states. The four states include; a power-on state, a power-off state (standby state), a charging state and an AC power supply state in which power is supplied from an AC adapter.

Figure 6:
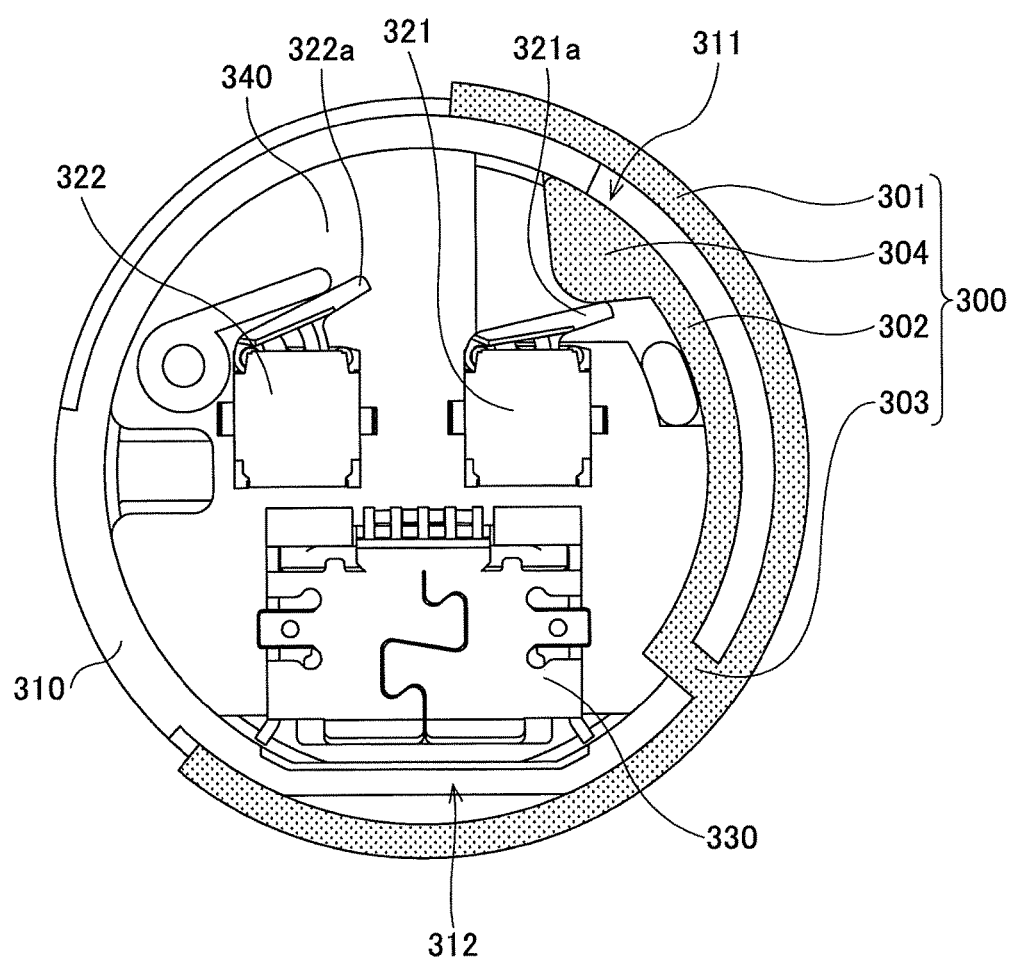
FIG. 6 is a cross-sectional view of a power source operation knob of the embodiment.
Figure 7:
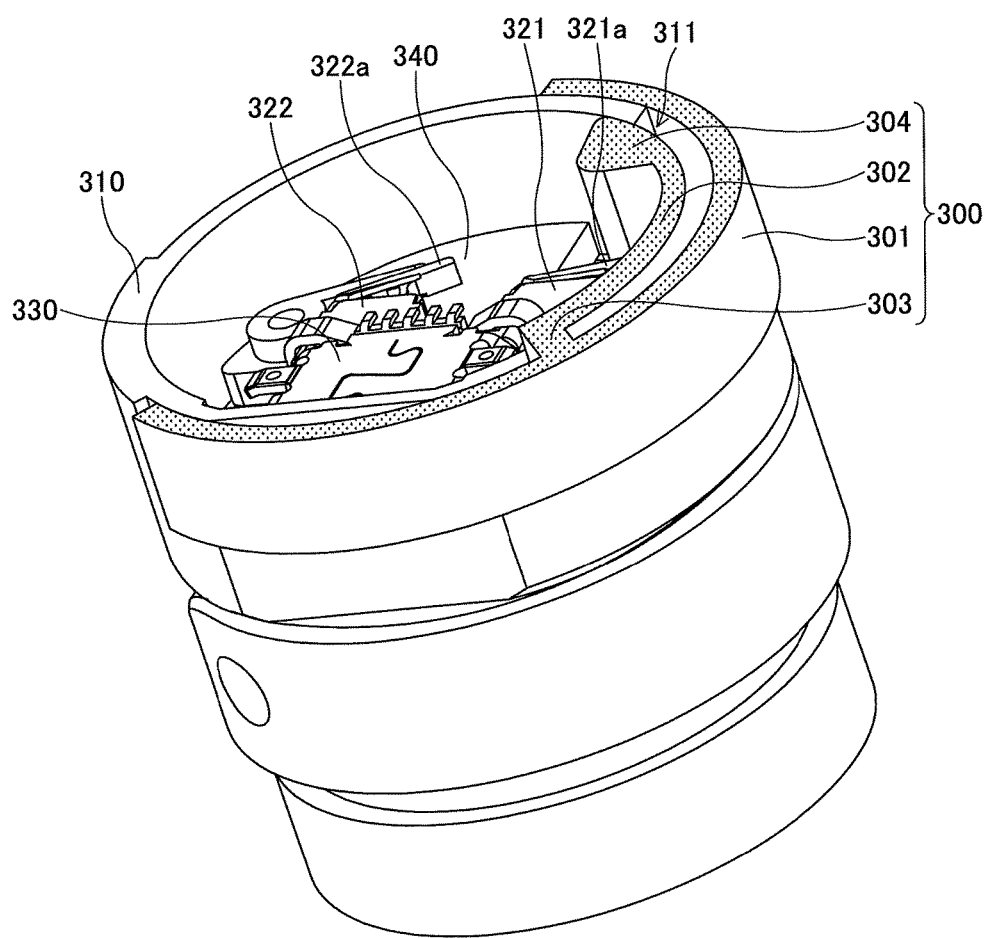
FIG. 7 is a perspective view of the power source operation knob of the embodiment.

FIG. 6 and FIG. 7 illustrate a power-on state in which the power source of the printer unit 200 is on. As illustrated in FIG. 6 and FIG. 7, the knob 300 includes an outer portion 301 that covers an outside of the case 310, an inner portion 302 that is positioned inside the case 310, a connection portion 303 that connects the outer portion 301 and the inner portion 302, and a push-down portion 304 provided at a front edge of the inner portion 302. The case 310 is provided with an opening 311 in which the connection portion 303 is received, and while the connection portion 303 moves in the opening 311, the knob 300 rotates along the case 310. The knob 300 attached to the case 310 is sandwiched between the outer portion 301 and the inner portion 302. The outer portion 301 of the knob 300 is operated by a user.

A substrate 340 on which a first switch 321, a second switch 322 and a USB connector 330 (connection terminal) are attached is provided in the case 310. Further, as will be described later, a connection opening 312 for connecting the USB connector 330 to an external USB plug (the USB plug 700) is provided at the case 310.

Under the state illustrated in FIG. 6 and FIG. 7, an arm 321a of the first switch 321 is pushed by the push-down portion 304 provided at the front edge of the inner portion 302. The first switch 321 is a normally closed switch and becomes open when the arm 321a is pushed by the push-down portion 304. At this time, the power of the printer unit 200 is on. Further, under this state, the opening 312 is closed by the outer portion 301, and the USB plug cannot be connected to the USB connector 330.

Figure 8:
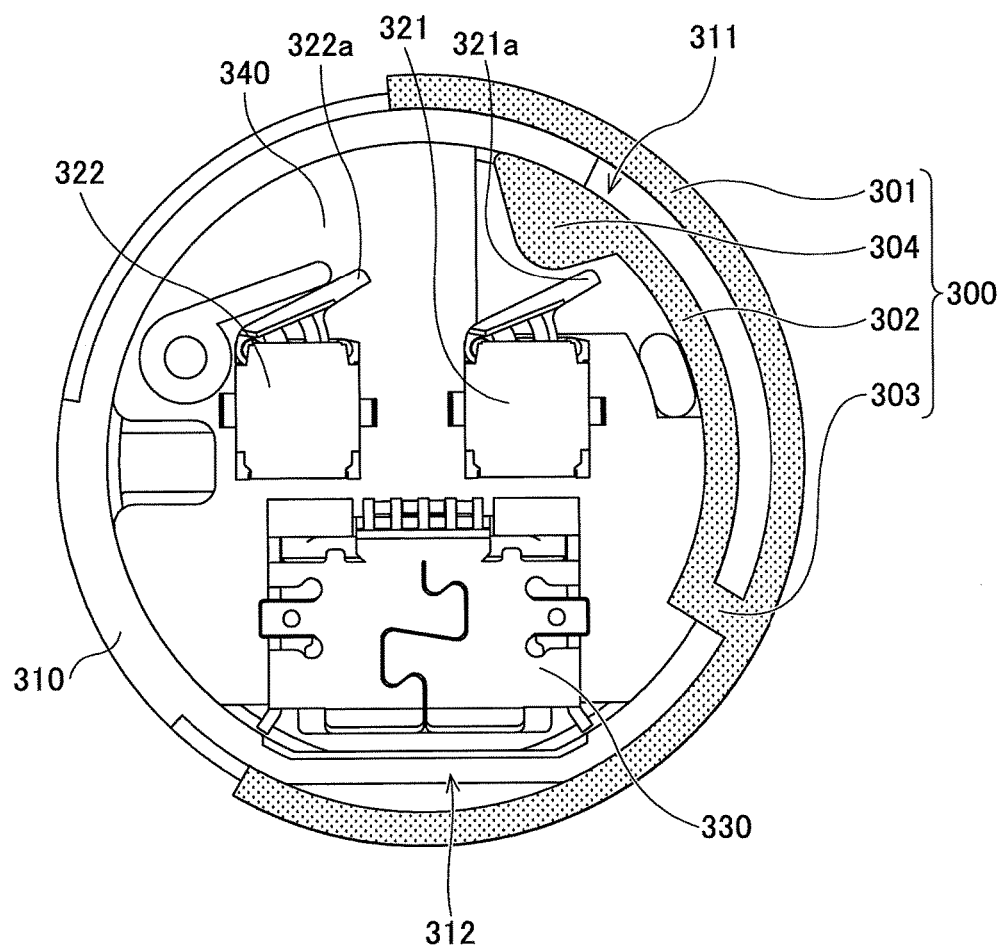
FIG. 8 is a cross-sectional view of the power source operation knob of the embodiment.

FIG. 8 illustrates a power-off state in which the power of the printer unit 200 is off. From the state illustrated in FIG. 6 and FIG. 7, the knob 300 is rotated in a counter-clockwise direction with respect to the case 310. With this, the push-down portion 304 is released from the arm 321a and the power of the printer unit 200 is switched off. The opening 312 is closed by the outer portion 301. Thus, the USB plug cannot be connected to the USB connector 330.

Figure 9:
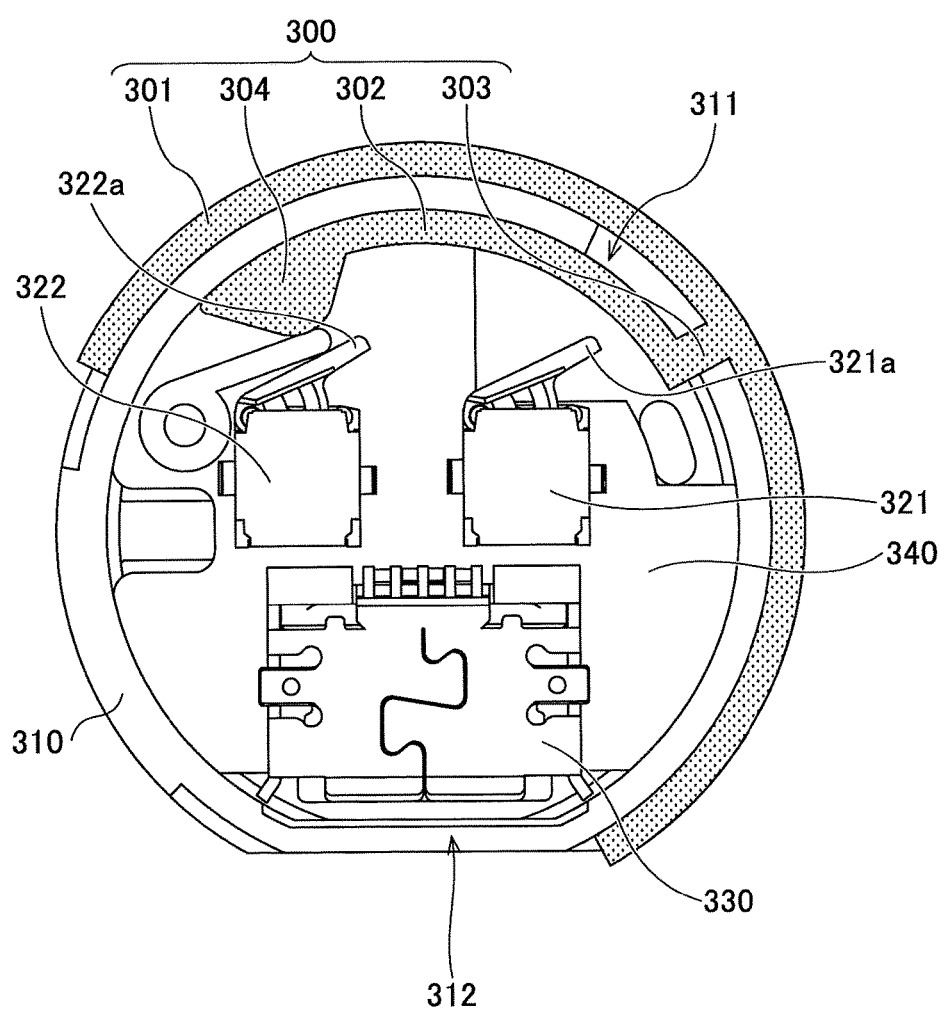
FIG. 9 is a cross-sectional view of the power source operation knob of the embodiment.

By further rotating the knob 300 in the counter-clockwise direction as illustrated in FIG. 9, the opening 312 is exposed. Under this state, as the push-down portion 304 does not push the arm 321a, the power of the printer unit 200 is off. However, as the opening 312 is exposed as illustrated in FIG. 3, the USB plug 700 can be connected to the USB connector 330 through the opening 312, and the battery 110 can be charged. Further, under the state of FIG. 9, an arm 322a of the second switch 322 is not pushed by the push-down portion 304. Under the state of FIG. 9, the power is not supplied to each of the printer unit 200 and the communication unit.

Figure 10:
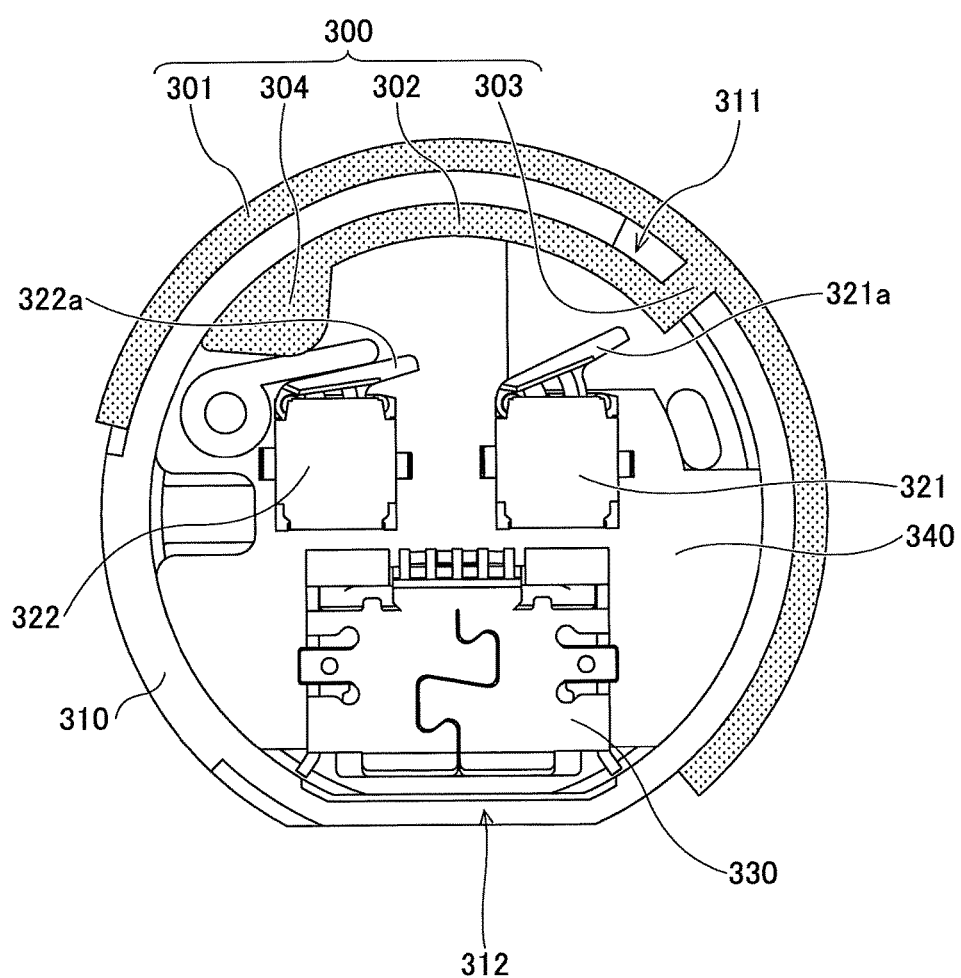
FIG. 10 is a cross-sectional view of the power source operation knob of the embodiment.
Figure 11:
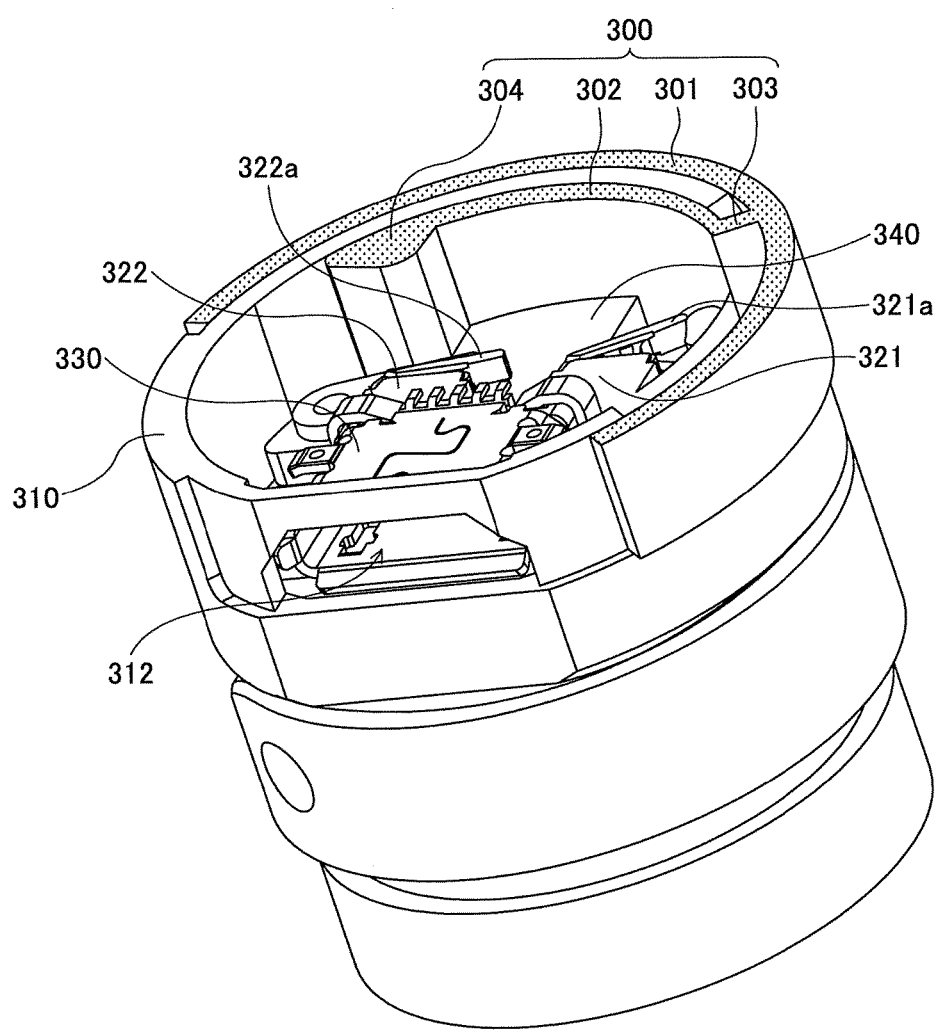
FIG. 11 is a perspective view of the power source operation knob of the embodiment.
Figure 40:
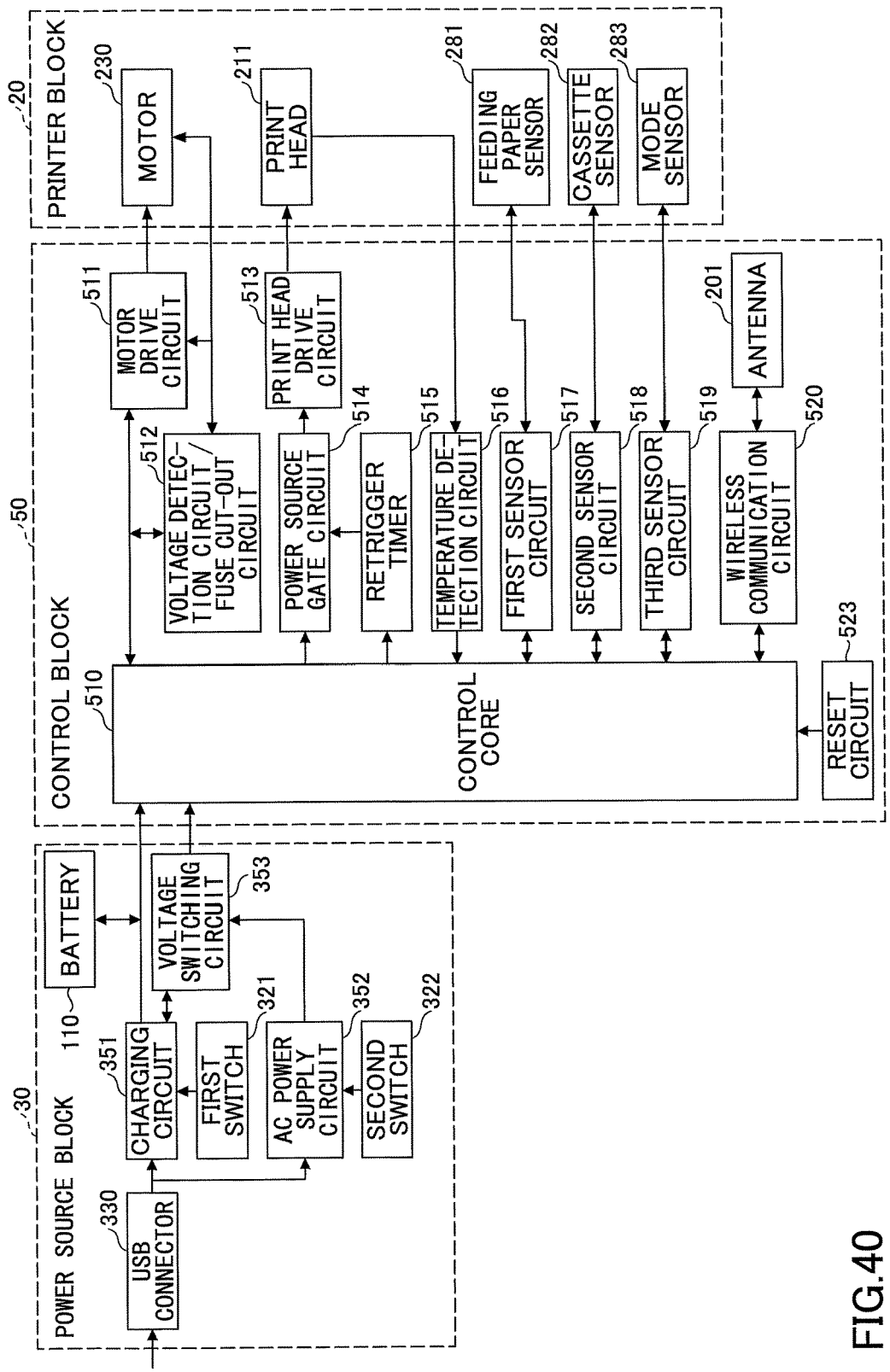
FIG. 40 is a block diagram of the electronic device of the embodiment.

By further rotating the knob 300 in the counter-clockwise as illustrated in FIG. 10 and FIG. 11, the arm 322a is pushed by the push-down portion 304 while the opening 312 is being exposed. Under this state, an AC adapter, not illustrated, can be connected to the USB connector 330, and a power can be supplied from the AC adapter. At this time, although the power source of the printer unit 200 is switched off, the communication unit is switched on. Thus, by supplying the power by the AC adapter, the communication unit can be operated. At this time, a charging circuit 351, which will be described later with reference to FIG. 40, is terminated. When the electronic device 10 is provided as an IoT device with a sensor, it is necessary to use the electronic device 10 for long time. Thus, it is preferable to use the electronic device 10 under a state as illustrated in FIG. 10 in which the power is supplied by the AC adapter.

The second switch 322 is a normally closed switch, and becomes open when the arm 322a is pushed by the push-down portion 304. If both of the first switch 321 and the second switch 322 are normally open switches, there is a risk that a contact is corroded when the switch is not used for long time and the switch cannot be on. Thus, a normally closed switch is used for each of the first switch 321 and the second switch 322.

In this embodiment, as the opening 312 is closed by the outer portion 301 at the power on state illustrated in FIG. 6 and FIG. 7 and at the power off state illustrated in FIG. 8, contaminations do not enter inside the electronic device 10 from the opening 312.

In this embodiment, the USB plug 700 can be connected to the USB connector 330 when the first switch 321 is switched off, thus, a separation of two states, the state that the power source is off when charging and the state that the charging is disabled when the power source is on, can be performed in a mechanical configuration.

(Printer Unit)

Figure 12:
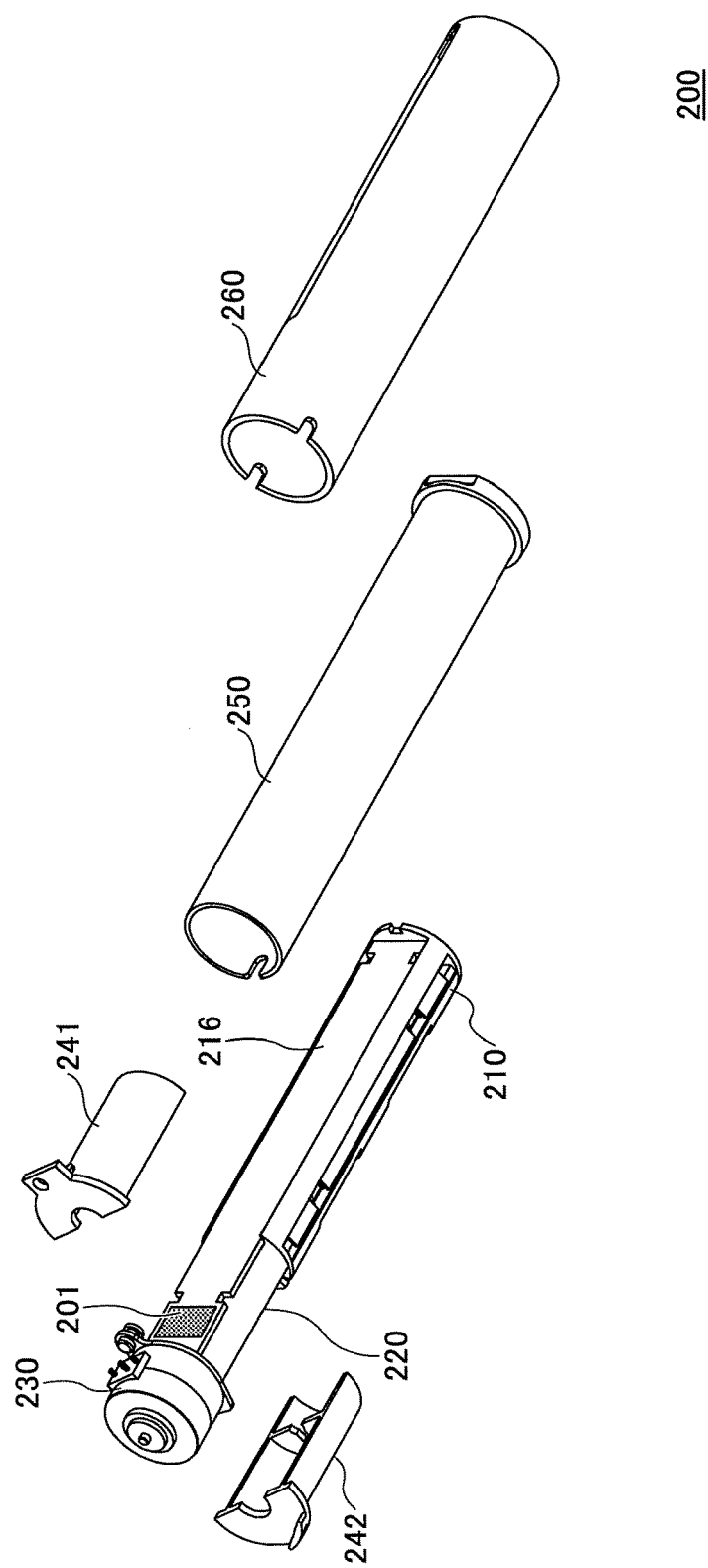
FIG. 12 is an exploded perspective view of a printer unit of the embodiment.
Figure 13:
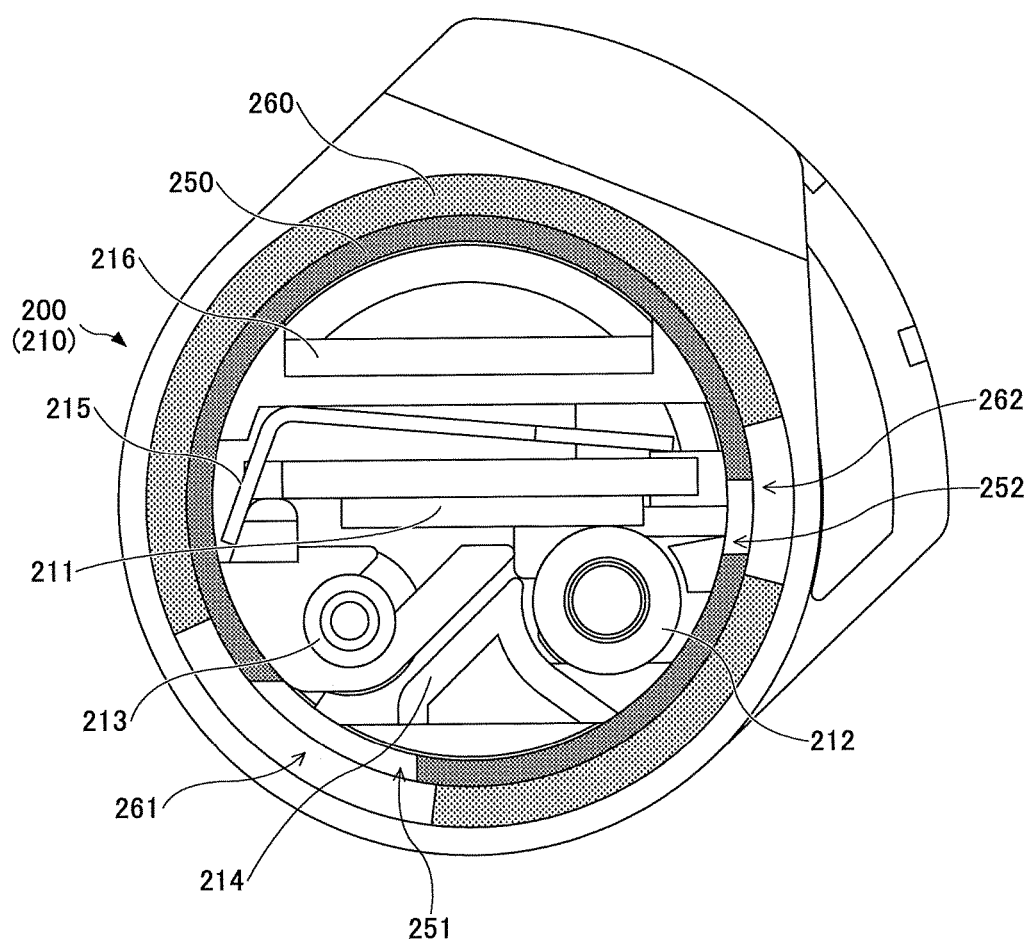
FIG. 13 is a cross-sectional view of the printer unit of the embodiment.
Figure 14A:
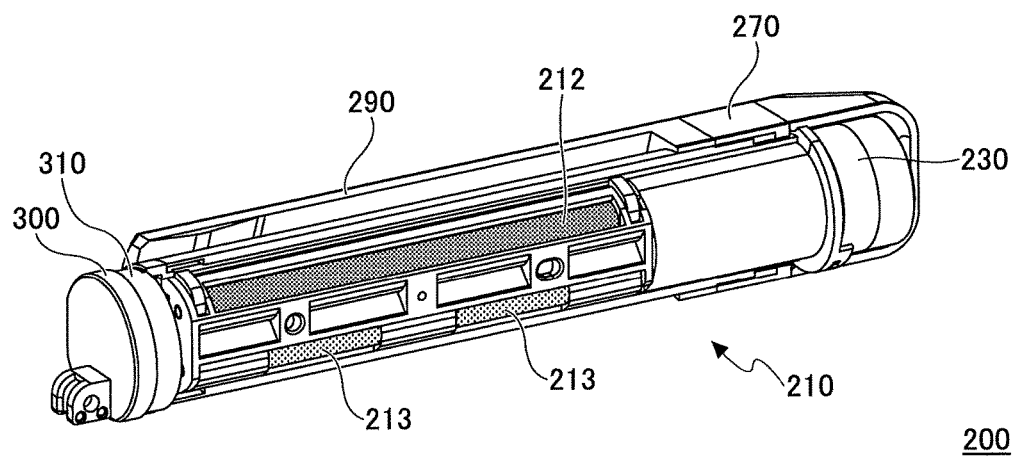
FIG. 14A and FIG. 14B are views for describing the printer unit of the embodiment.
Figure 14B:
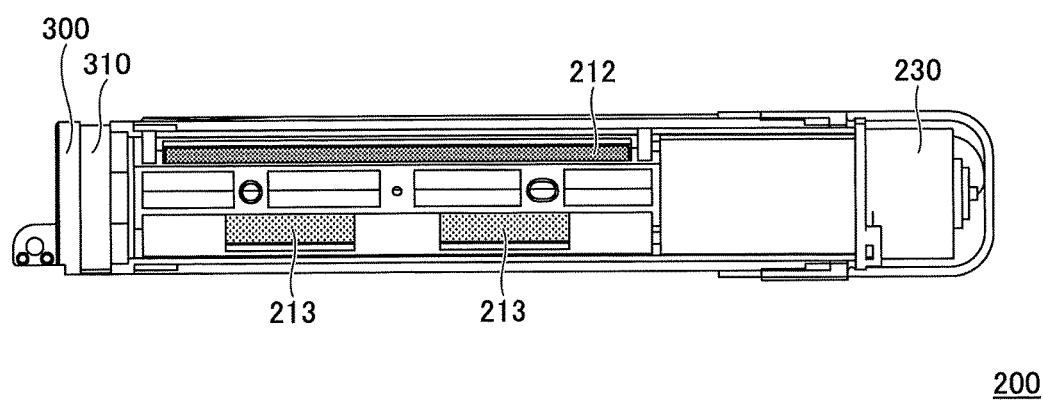

Next, the printer unit 200 is described. FIG. 12 is an exploded perspective view of the printer unit 200. FIG. 13 is a cross-sectional view of the printer unit 200 taken along a plane that is perpendicular to a longitudinal direction of the printer unit 200. FIG. 14A is a cross-sectional perspective view in the longitudinal direction, and FIG. 14B is a cross-sectional view along the longitudinal direction, of the printer unit 200. As illustrated in FIG. 12, the printer unit 200 includes a printer mechanical unit 210, a gear unit 220 including a gear box, a motor 230, an upper cover 241 and a lower cover 242 of a gear box, an inner cover 250 and an outer cover 260.

As illustrated in FIG. 13 to FIG. 14B, the mechanical unit 210 includes a print head 211 such as a thermal head, a platen roller 212, a feeding roller 213, a sheet guide 214, a pressure spring 215 and a substrate 216. The print head 211 is pushed by spring force of the spring 215 toward the platen roller 212. A recording paper is introduced from a side at which the slightly adhesive feeding roller 213 is provided along the sheet guide 214. Then, the recording paper is fed by a rotation of the platen roller 212 while being sandwiched between the print head 211 and the platen roller 212. Electronic circuits and electronic components for controlling the printer unit 200 are mounted on the substrate 216. In order to prevent jam of the recording paper in the printer unit 200, a rotation speed of the feeding roller 213 is set to be slower than that of the platen roller 212. Further, the feeding roller 213 may include a one way clutch. When the recording paper is sandwiched between the print head 211 and the platen roller 212, the recording paper is fed at the feeding speed of the platen roller 212. At this time, as the feeding roller 213 rotates slower than the platen roller, the feeding roller 213 slips due to a function of the one way clutch, and an influence on a print quality can be avoided.

As illustrated in FIG. 12, the mechanical unit 210, the gear unit 220 and the motor 230 are provided and connected to be coaxial with respect to the cylindrical case (the inner cover 250 and the outer cover 260). When the motor 230 rotates, the rotation of the motor 230 is transmitted to the platen roller 212 via the gear unit 220, and the platen roller 212 is rotated. By providing the gear unit 220 between the mechanical unit 210 and the motor 230, the mechanical unit 210, the gear unit 220 and the motor 230 can be coaxially connected.

As illustrated in FIG. 12, the antenna 201 for the wireless communication is formed on the substrate 216 at a position inside the knob 270. By covering the gear box of the gear unit 220 by a resin material and mounting the antenna 201 inside the knob 270, it is possible to control directivity of a radio wave. Further, repulsive force of the spring 215 can be used for positioning the mechanical unit 210 in the inner cover 250 of a concentric circle.

Each of the inner cover 250 and the outer cover 260 has a cylindrical shape. The inner cover 250 is formed to be received in the outer cover 260. As illustrated in FIG. 13, the inner cover 250 is provided with an inner feeding port 251 and an inner ejecting port 252 that are open along a longitudinal direction of the inner cover 250. Similarly, the outer cover 260 is provided with an outer feeding port 261 and an outer ejecting port 262 that are open along a longitudinal direction of the outer cover 260. The inner cover 250 and the outer cover 260 are configured such that the inner feeding port 251 and the outer feeding port 261 are matched to be open when the inner ejecting port 252 and the outer ejecting port 262 are matched to be open.

Figure 15:
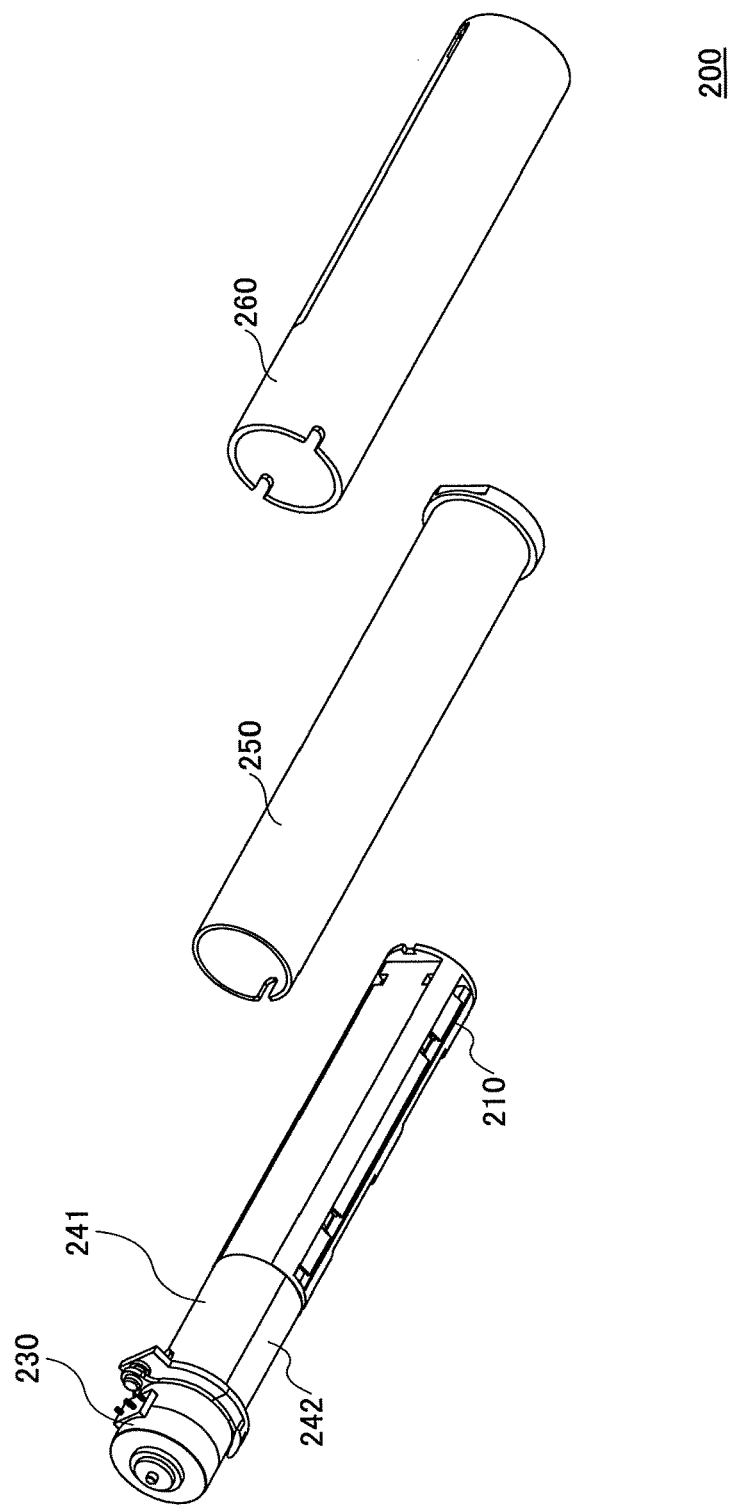
FIG. 15 is a view for describing the printer unit of the embodiment.
Figure 16:
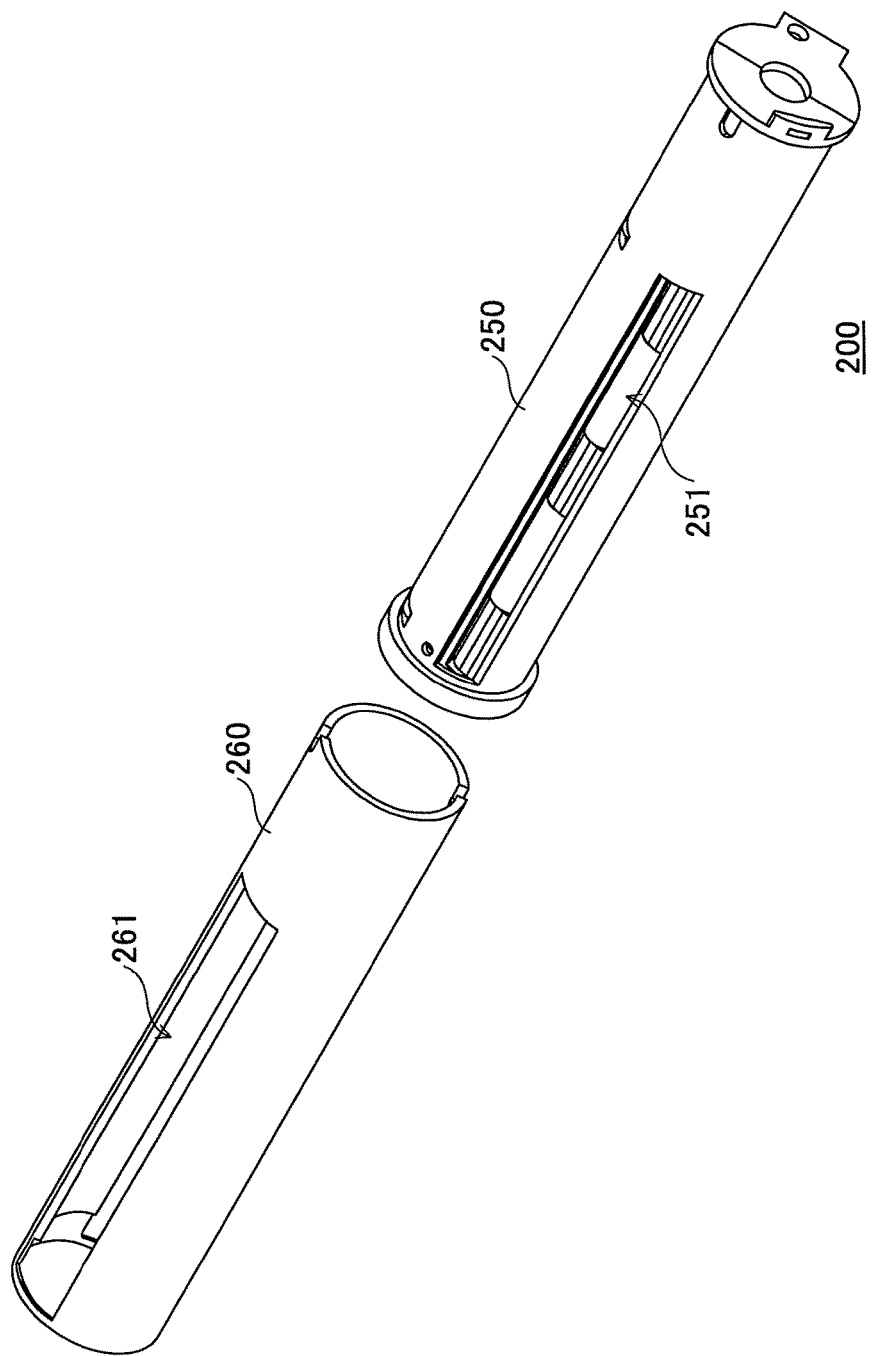
FIG. 16 is a view for describing the printer unit of the embodiment.
Figure 17:
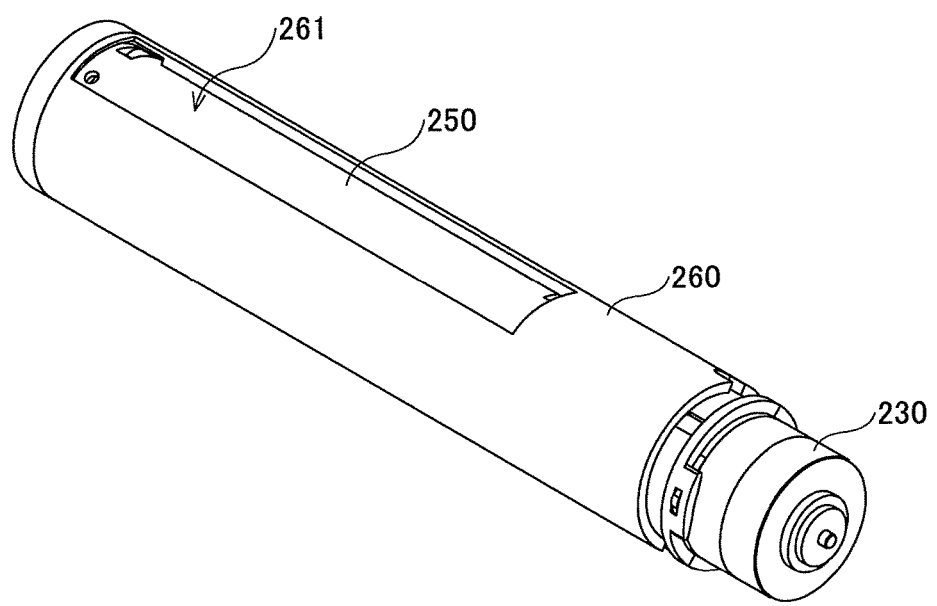
FIG. 17 is a view for describing the printer unit of the embodiment.
Figure 18:
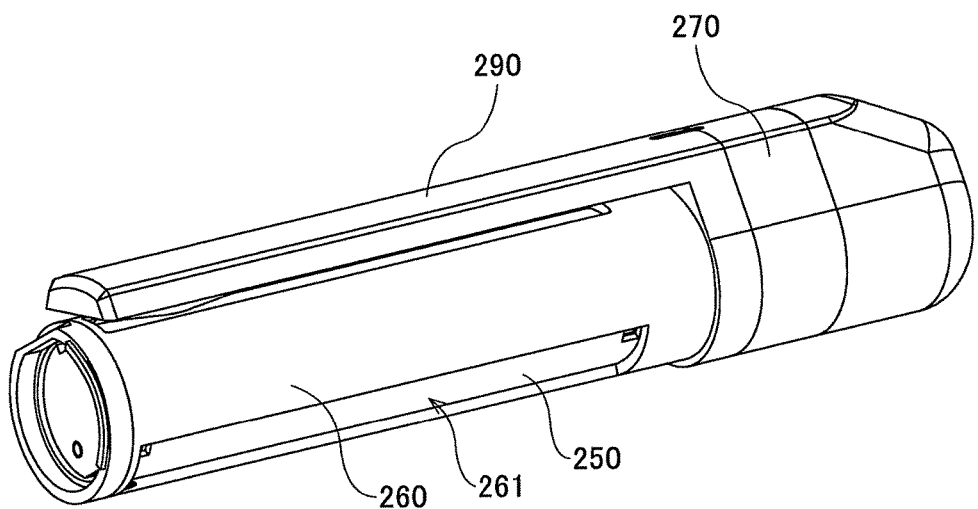
FIG. 18 is a view for describing the printer unit of the embodiment.

As illustrated in FIG. 15, the upper cover 241 and the lower cover 242 made of a resin are attached around the gear unit 220 so as to cover the gear box. As illustrated in FIG. 16, mechanical unit 210, the gear unit 220, and the motor 230 to which the upper cover 241 and the lower cover 242 are attached are received in the inner cover 250. The motor 230 is not illustrated in FIG. 16. Further, as illustrated in FIG. 17, the inner cover 250 is received in the outer cover 260. Then, as illustrated in FIG. 18, the hook 290 and the knob 270 are attached at the motor 230 side. The hook 290 is connected to the inner cover 250, and the knob 270 is connected to the outer cover 260.

Thus, by rotating the knob 270, the outer cover 260 can be rotated with respect to the inner cover 250. With this, the printer unit 200 can be switched between three operation modes. Switching of the three operation modes is described with reference to FIG. 19 to FIG. 33.

Figure 19:
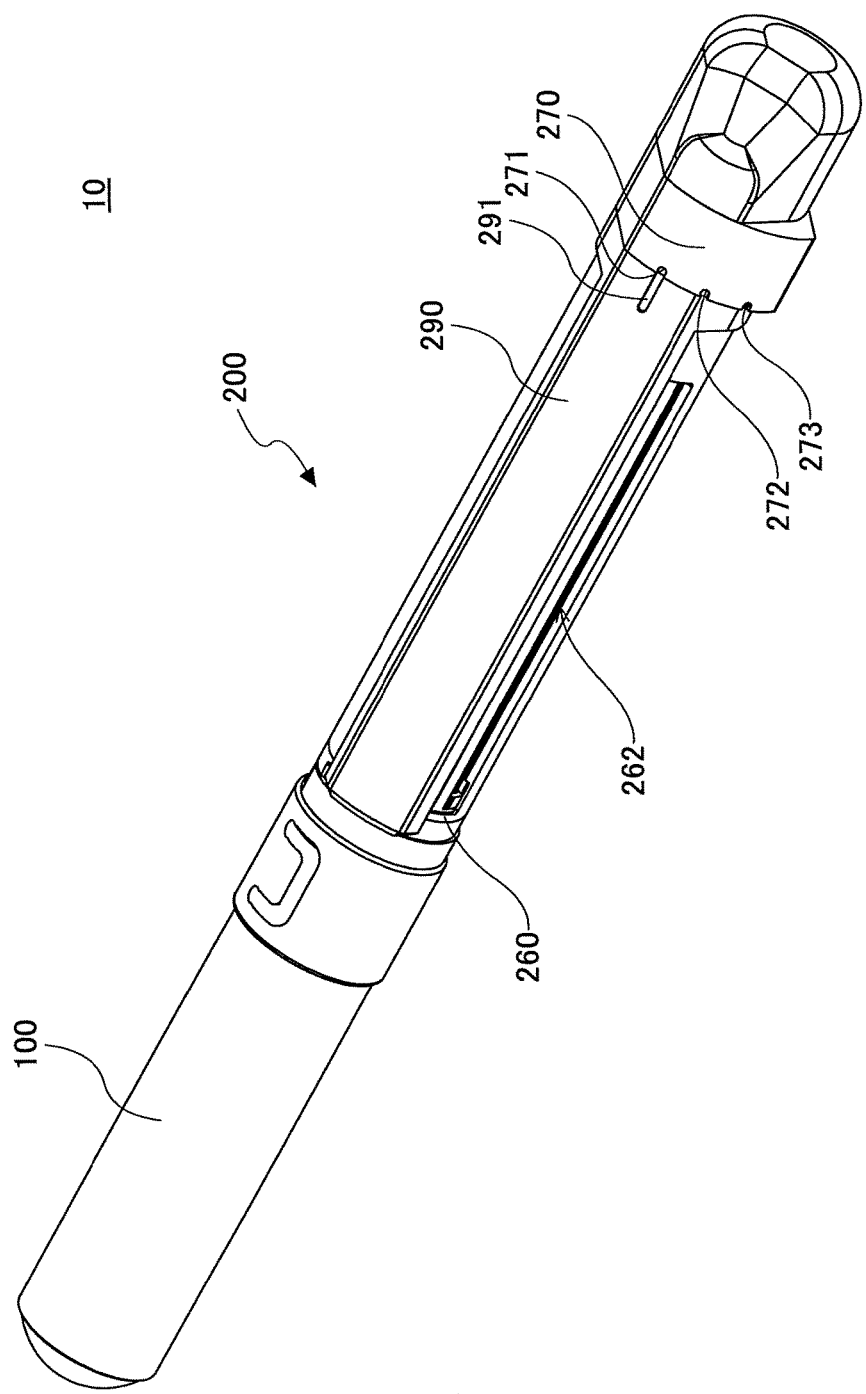
FIG. 19 is a view for describing the printer unit of the embodiment at a first state.

As illustrated in FIG. 19, a recess 291 is provided at the hook 290 near the knob 270, and three recesses 271, 272 and 273, each corresponding to the recess 291, are provided at the knob 270. The three recesses 271, 272 and 273 correspond to the three modes, respectively. By matching the recess 291 to one of the recesses 271, 272, and 273, the operation mode is switched. A sensor for detecting the operation modes may be provided in the electronic device 10.

Figure 20:
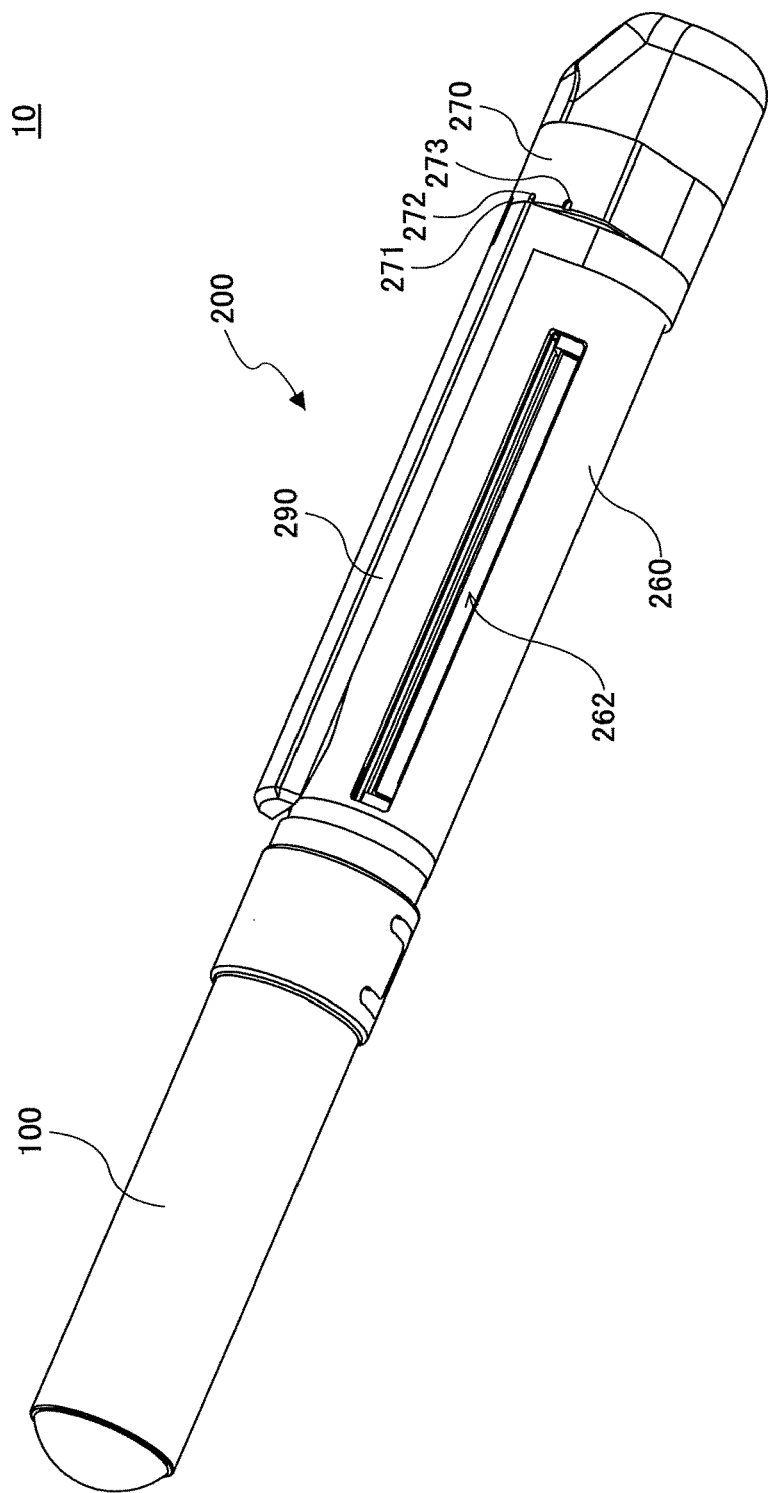
FIG. 20 is a view for describing the printer unit of the embodiment at the first state.
Figure 21:
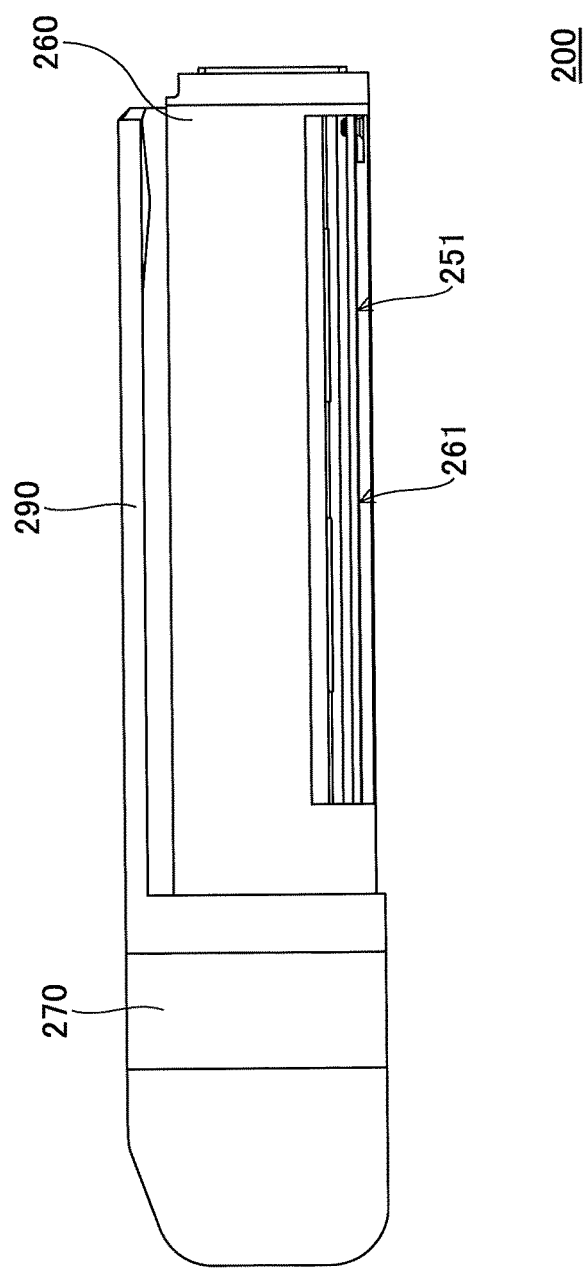
FIG. 21 is a view for describing the printer unit of the embodiment at the first state.
Figure 22:
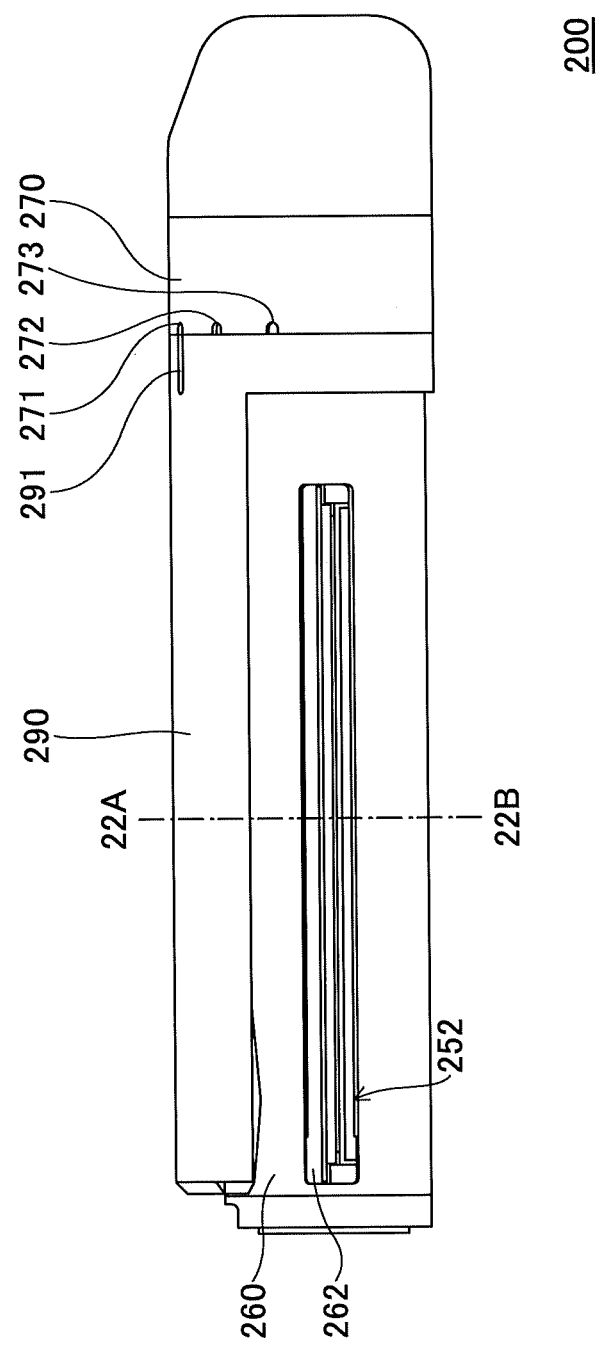
FIG. 22 is a view for describing the printer unit of the embodiment at the first state.

FIG. 19 to FIG. 22 and FIG. 13 illustrate the printer unit 200 at a first state, which is a print mode that the printing operation may be performed. FIG. 19 and FIG. 20 are perspective views of the electronic device 10 at the print mode, FIG. 21 illustrates a feeding side of the printer unit 200 and FIG. 22 illustrates an ejecting side of the printer unit 200. FIG. 13 is a cross-sectional view taken along a chain line 22A-22B of FIG. 22.

As illustrated in FIG. 13, positions of the inner feeding port 251 and the outer feeding port 261 are matched and opened, and positions of the inner ejecting port 252 and the outer ejecting port 262 are matched and opened. Further, the recess 291 is positioned to match the recess 271.

A recording paper can be fed into the printer unit 200 from the inner feeding port 251 and the outer feeding port 261, and ejected from the inner ejecting port 252 and the outer ejecting port 262.

When performing printing by the printer unit 200, print data is sent from a smartphone or the like to the electronic device 10 by a wireless communication such as BLE. The electronic device 10 receives the print data via the antenna 201, and the printer unit 200 prints the print data.

Figure 23:
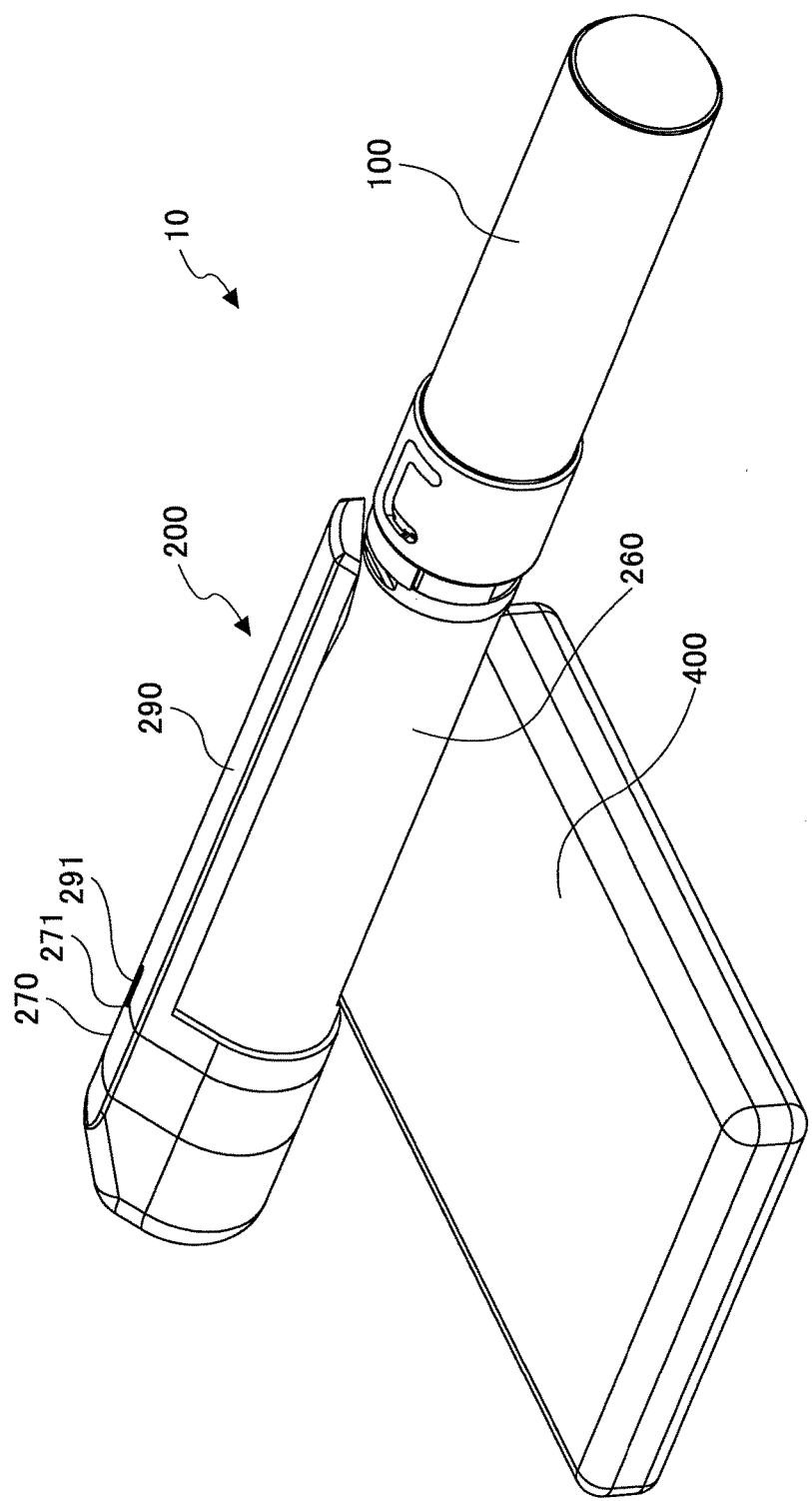
FIG. 23 is a view illustrating the electronic device to which a cassette is connected.

When the electronic device 10 is at the print mode, the inner feeding ports 251 and the outer feeding port 261 are open, and as illustrated in FIG. 23, a cassette 400 that accommodates the recording papers can be connected to the outer feeding port 261. FIG. 23 is a perspective view illustrating a state in which the cassette 400 is connected to the outer feeding port 261. The feeding roller 213 contacts and presses the recording paper in the cassette 400 and feeds the recording paper toward the platen roller 212 from the feeding ports 251 and 261 (see FIG. 13, for example).

Figure 24:
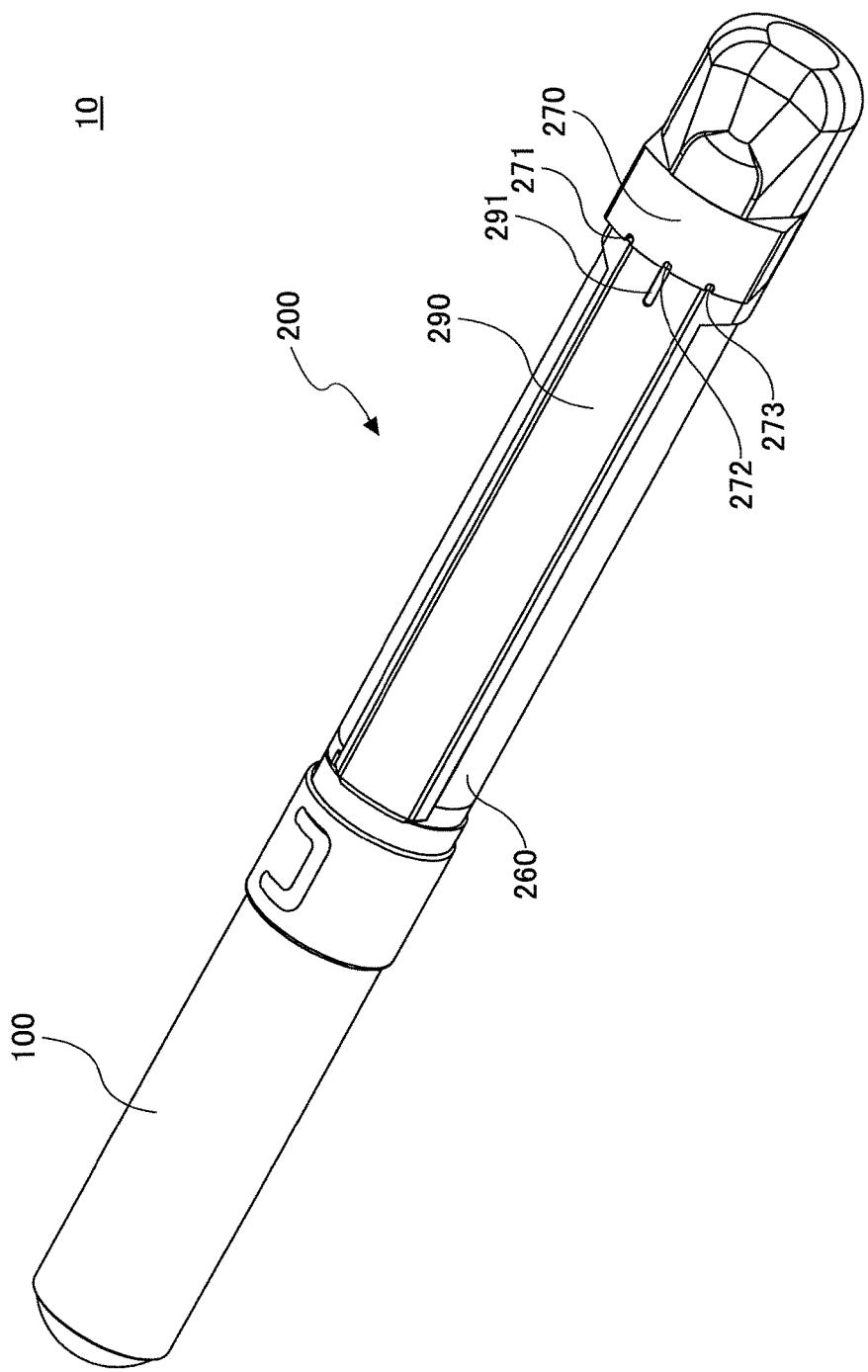
FIG. 24 is a view for describing the printer unit of the embodiment at a second state.
Figure 25:
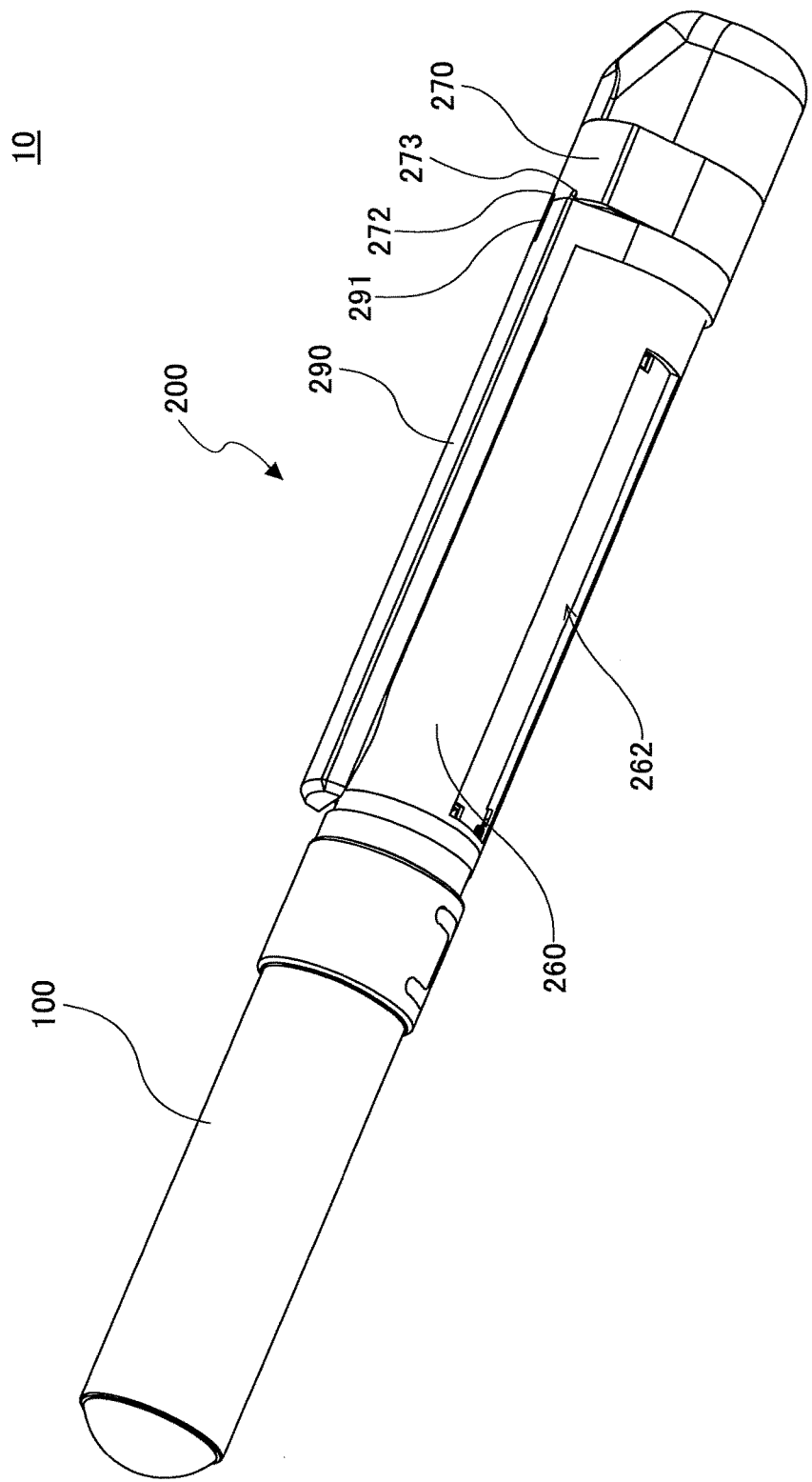
FIG. 25 is a view for describing the printer unit of the embodiment at the second state.
Figure 26:
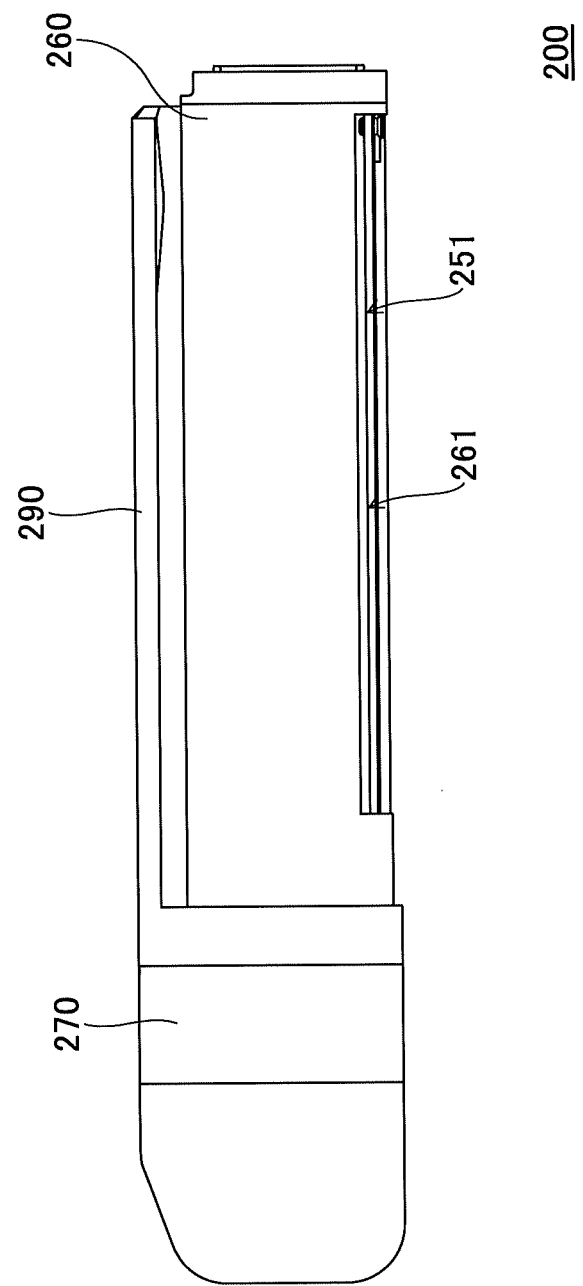
FIG. 26 is a view for describing the printer unit of the embodiment at the second state.
Figure 27:
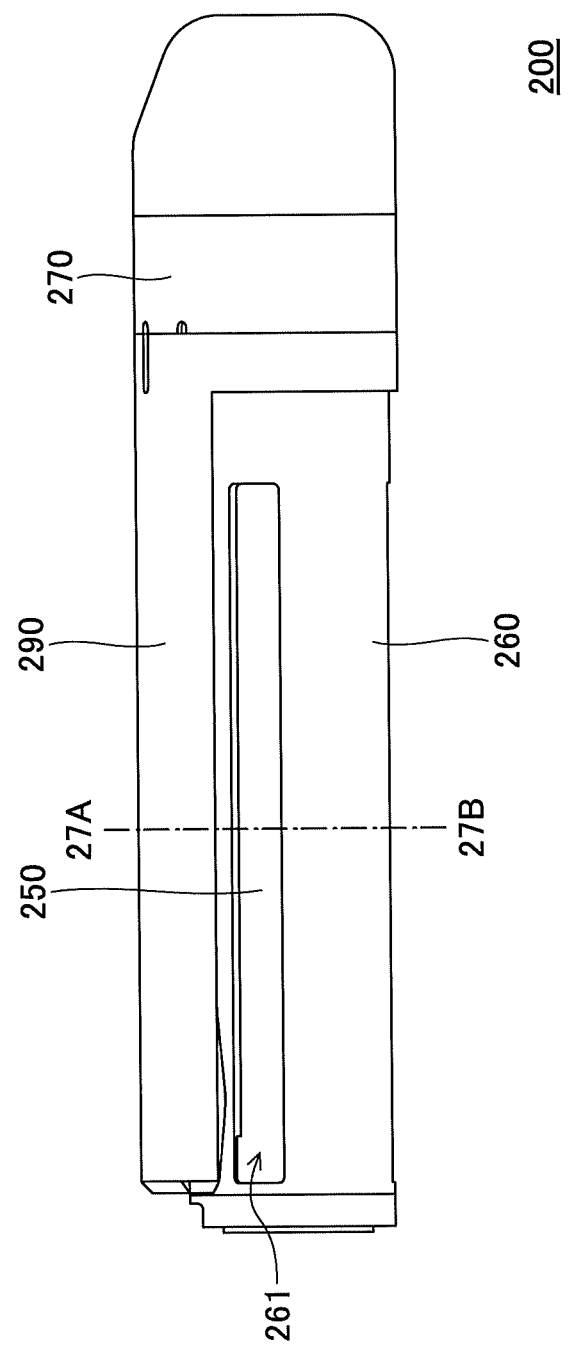
FIG. 27 is a view for describing the printer unit of the embodiment at the second state.
Figure 28:
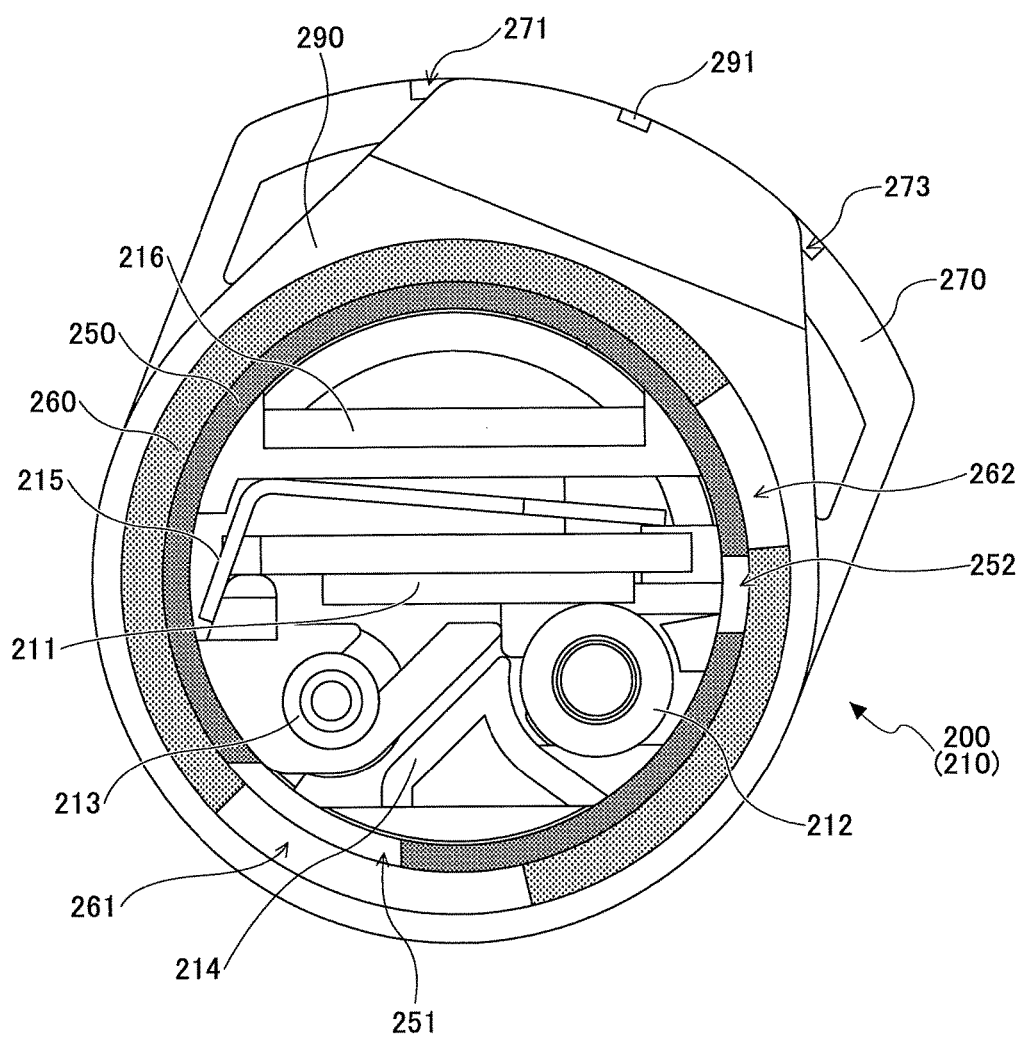
FIG. 28 is a view for describing the printer unit of the embodiment at the second state.

FIG. 24 to FIG. 28 illustrate the printer unit 200 at a second state, which is a standby mode. The standby mode is an operation mode in which the printing is standby, and the power of the printer unit 200 is off. FIG. 24 and FIG. 25 are perspective views of the electronic device 10 at the standby mode, FIG. 26 illustrates a paper feeding side of the printer unit 200 and FIG. 27 illustrates a paper ejecting side of the printer unit 200. FIG. 28 is a cross-sectional view taken along a chain line 27A-27B of FIG. 27.

The inner feeding port 251 and the outer feeding port 261 are larger than the inner ejecting port 252 and the outer ejecting port 262, respectively. Thus, under the state of FIG. 28, although positions of the inner feeding port 251 and the outer feeding port 261 are matched and opened, positions of the inner ejecting port 252 and the outer ejecting port 262 are not matched and closed. Further, the recess 291 is positioned to match the recess 272.

Although printing is not performed in the printer unit 200 under the standby mode, positions of the inner feeding port 251 and the outer feeding port 261 are matched, and the cassette 400 can be connected to the outer feeding port 261. Thus, the electronic device 10 can be carried while the cassette 400 is connected to the outer feeding port 261.

Figure 29:
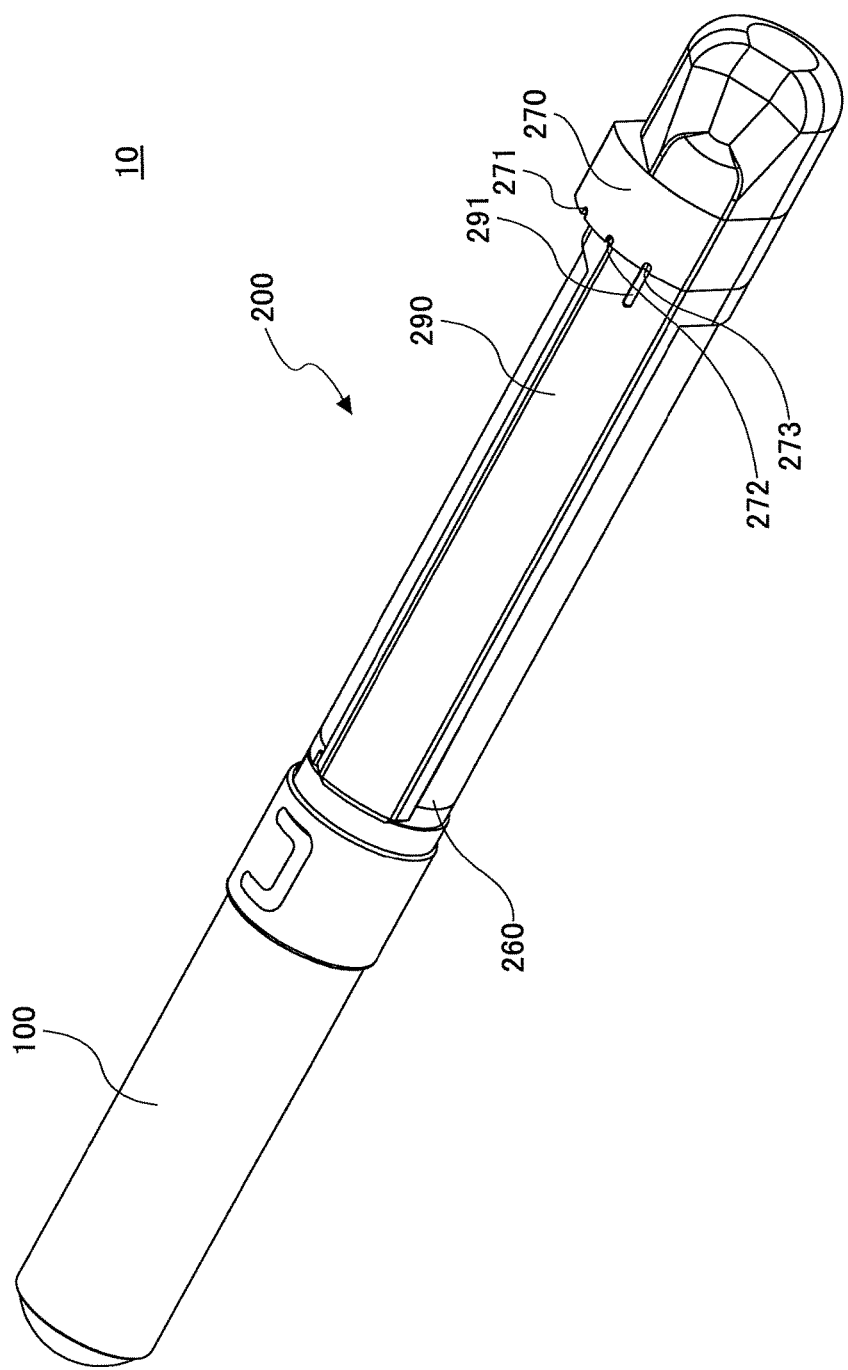
FIG. 29 is a view for describing the printer unit of the embodiment at a third state.
Figure 30:
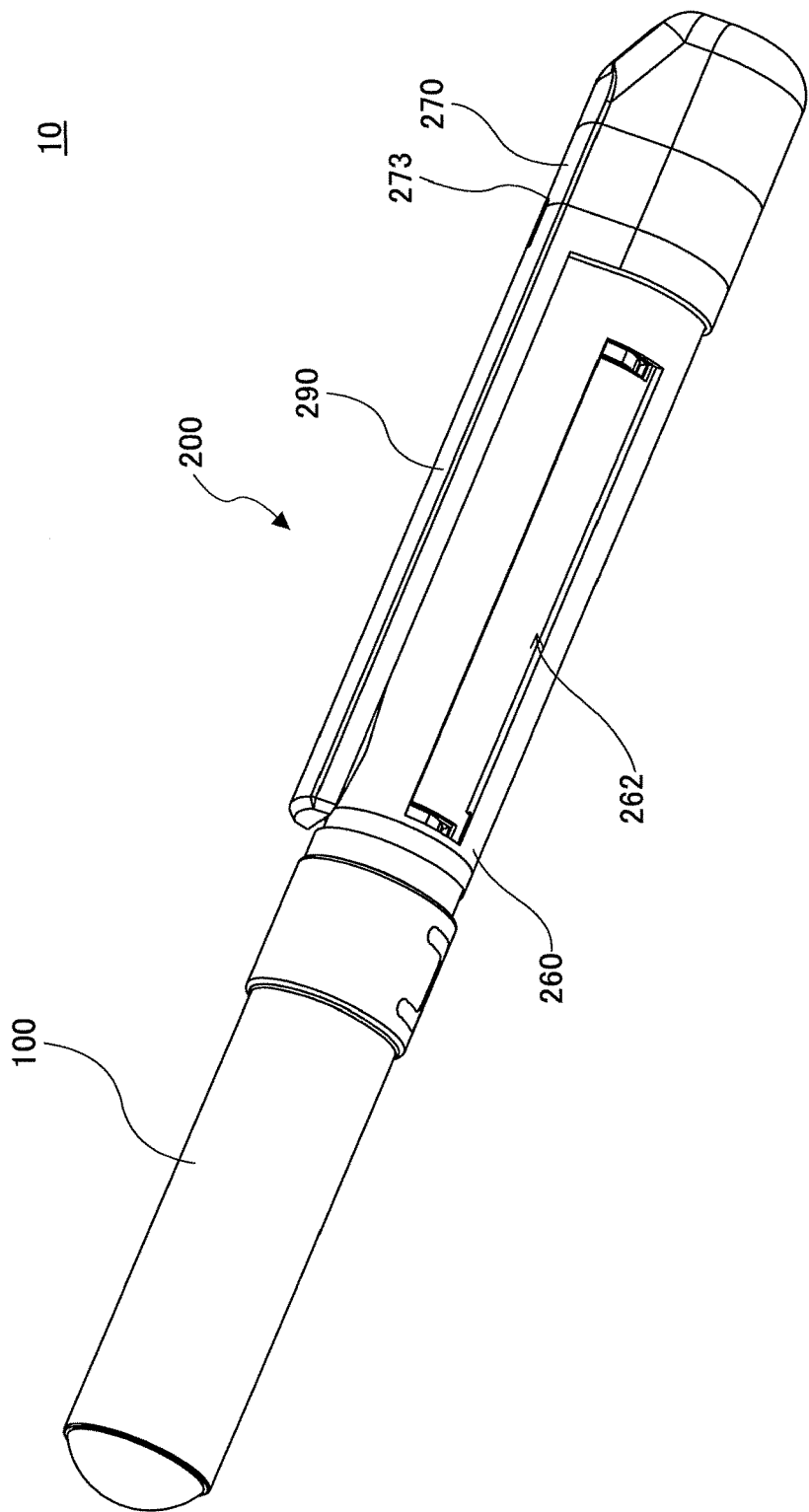
FIG. 30 is a view for describing the printer unit of the embodiment at the third state.
Figure 31:
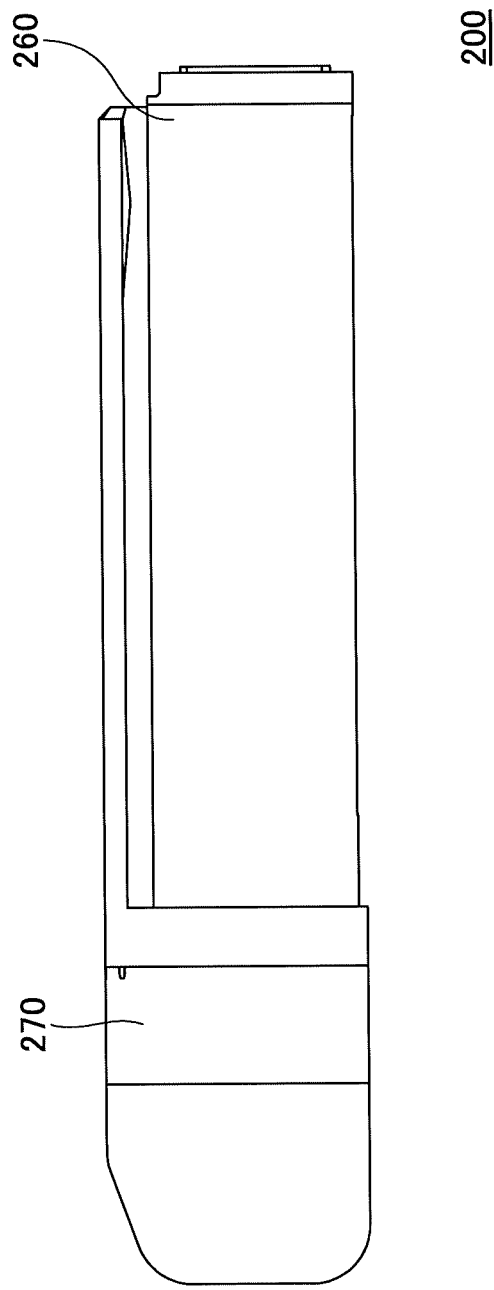
FIG. 31 is a view for describing the printer unit of the embodiment at the third state.
Figure 32:
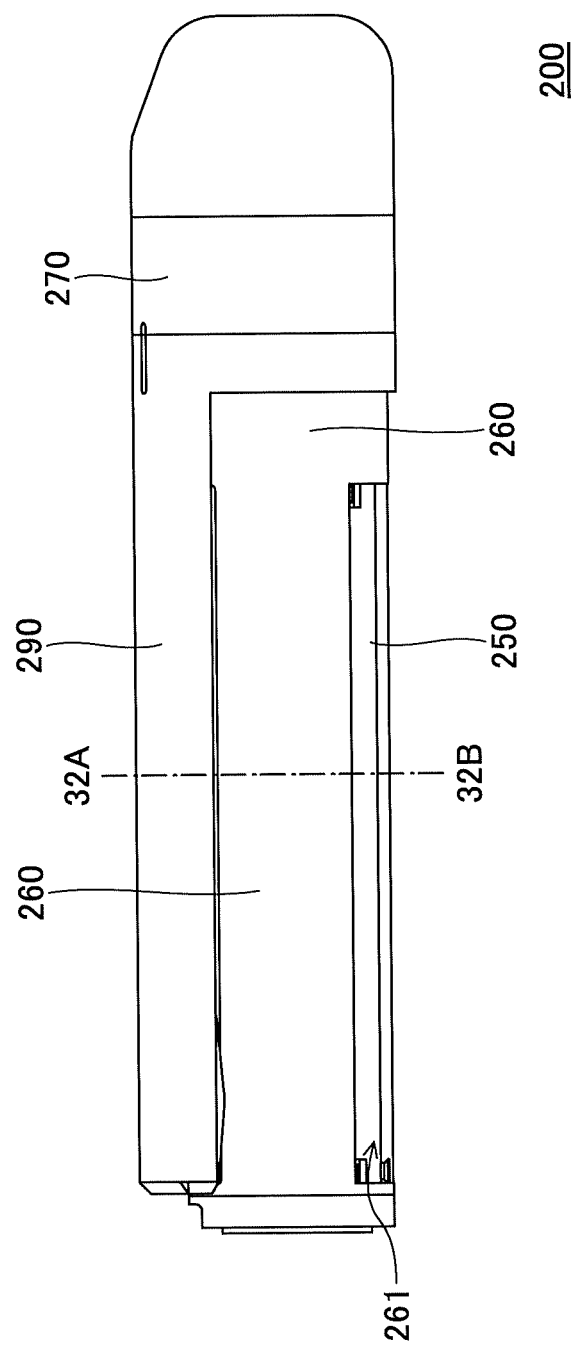
FIG. 32 is a view for describing the printer unit of the embodiment at the third state.
Figure 33:
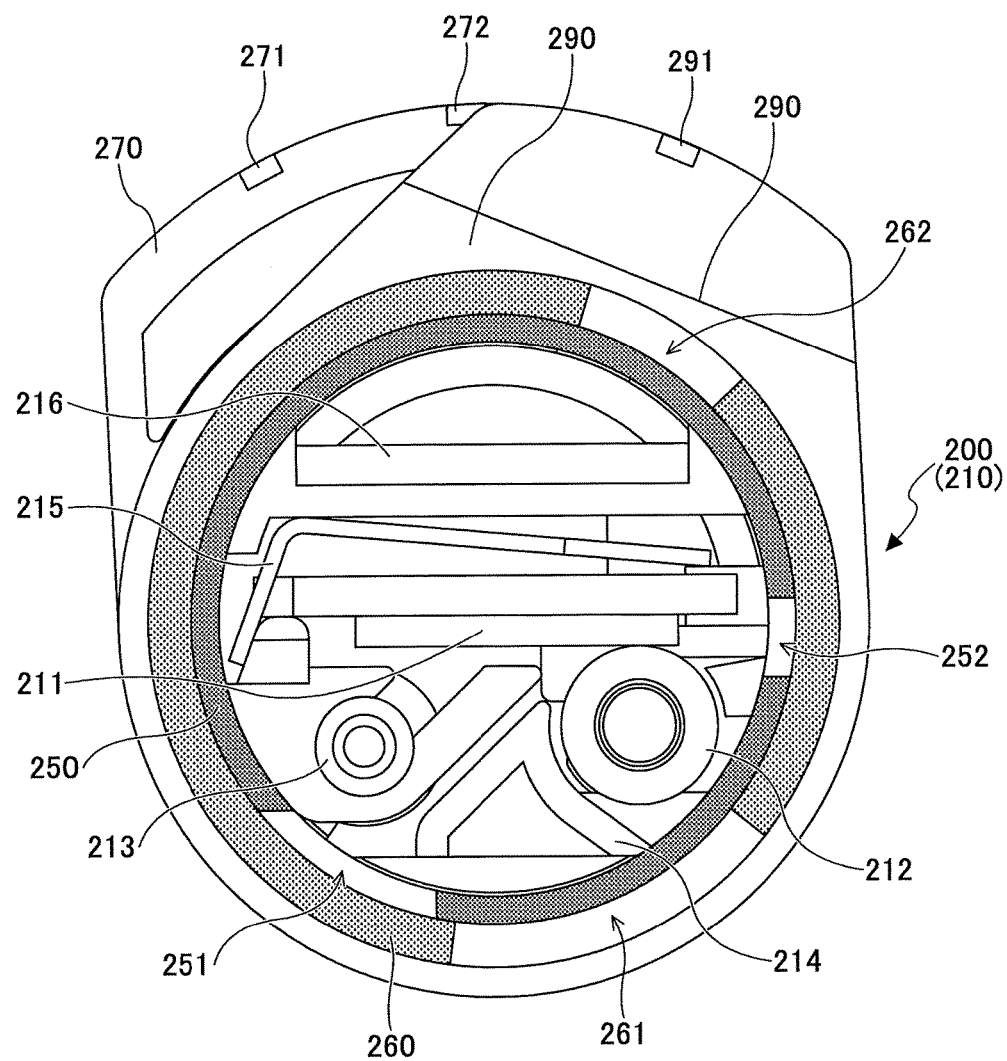
FIG. 33 is a view for describing the printer unit of the embodiment at the third state.

FIG. 29 to FIG. 33 illustrate the printer unit 200 at a third state, which is a communication mode in which wireless communication by BLE or the like can be performed. FIG. 29 and FIG. 30 are perspective views of the electronic device 10 at the communication mode, FIG. 31 illustrates a paper feeding side of the printer unit 200 and FIG. 32 illustrates a paper ejecting side of the printer unit 200. FIG. 33 is a cross-sectional view taken along a chain line 32A-32B of FIG. 32.

Under the communication mode, positions of the inner feeding port 251 and the outer feeding port 261 are not matched and positions of the inner ejecting port 252 and the outer ejecting port 262 are not matched. Further, the recess 291 is positioned to match the recess 272.

Under the communication mode, a printing operation is not performed and the cassette 400 is detached. Thus, the electronic device 10 can be carried while being inserted in a chest pocket of clothes, similarly as a pen. It is preferable that openings provided at the outer cover 260 such as the outer feeding port 261 and the outer ejecting port 262 are not visible from an aesthetic view. Thus, in FIG. 29, the outer ejecting port 262 is covered by the hook 290 so that the outer ejecting port 262 is invisible from outside to make an appearance of the electronic device 10 good. Although the outer feeding port 261 is not covered by the hook 290, as the outer feeding port 261 is provided at a substantially opposite to the outer ejecting port 262 in the printer unit 200, when the hook 290 is inserted in a chest pocket, the outer feeding port 261 is hardly seen, and does not influence on the appearance of the electronic device 10.

Figure 34:
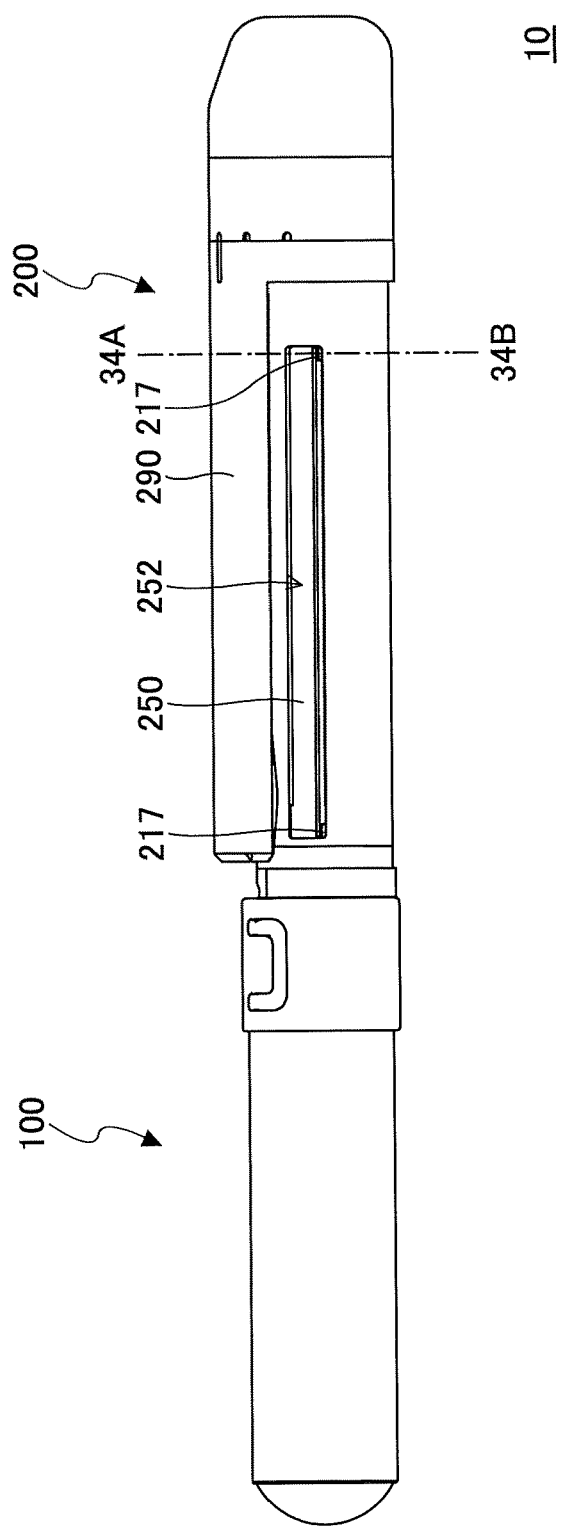
FIG. 34 is a view for describing a head-up claw of the printer unit.
Figure 35:
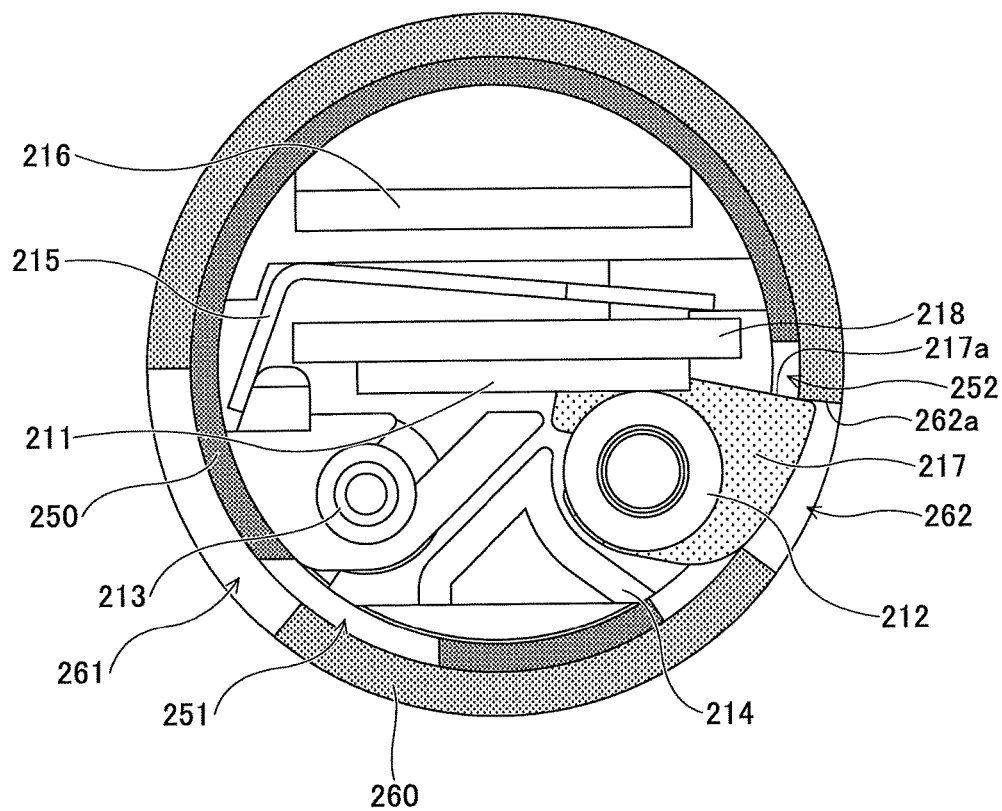
FIG. 35 is a view for describing the head-up claw of the printer unit.
Figure 36:
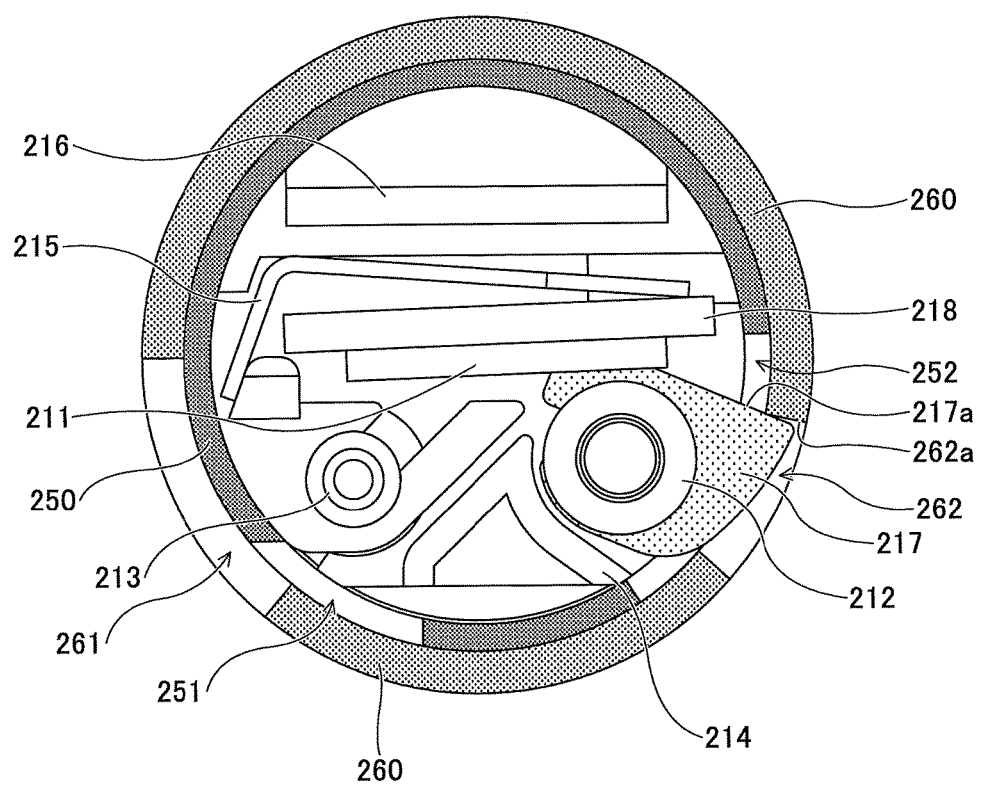
FIG. 36 is a view for describing the head-up claw of the printer unit.
Figure 37:
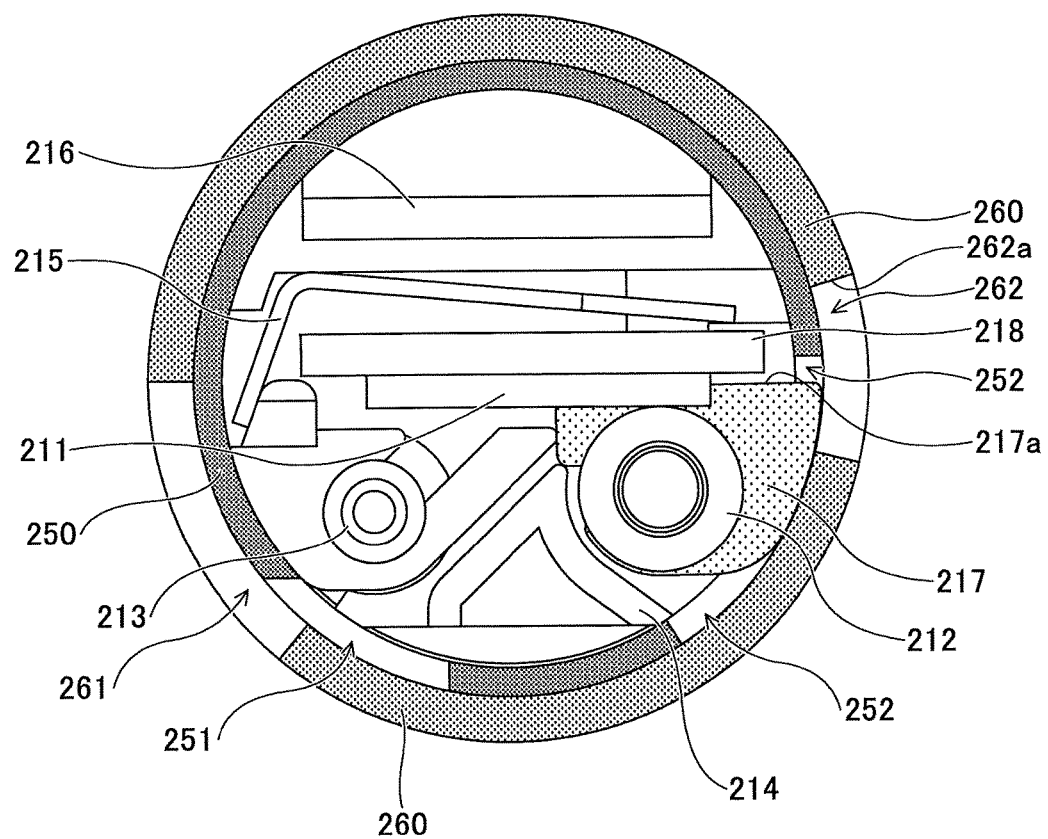
FIG. 37 is a view for describing the head-up claw of the printer unit.

As illustrated in FIG. 34, head-up claws 217 are provided in the printer unit 200 near both edges of the inner ejecting port 252 in its longitudinal direction for dissolving a paper jam. The claws 217 are provided inside the inner cover 250, and a part of each of the claws 217 is protruded from the inner ejecting port 252. FIG. 35 to FIG. 37 are cross-sectional views of the printer unit 200 taken along a chain line 34A-34B of FIG. 34.

When the recording paper is jammed, an edge 262a of the outer ejecting port 262 contacts a contact portion 217a of the claw 217 that is protruded from the inner ejecting port 252 by rotating the outer cover 260 in a clockwise direction from the print mode as illustrated in FIG. 35. When the outer cover 260 is further rotated in the clockwise direction as illustrated in FIG. 36, the contact portion 217a is pushed, and the claw 217 is rotated in a clockwise direction around a rotational axis of the platen roller 212, and a radiation plate 218 to which the print head 211 is attached is pushed up. With this, the print head 211 and the platen roller 212 are separated from each other, and the recording paper can be removed.

After removing the recording paper, the outer cover 260 is rotated in the counter-clockwise direction as illustrated in FIG. 37. With this, a portion of the claw 217 protrudes from the inner ejecting port 252 contacts an inner wall of the outer cover 260, and the claw 217 is rotated in the counterclockwise direction to be received in the outer cover 260 and return to the print mode.

Figure 38A:
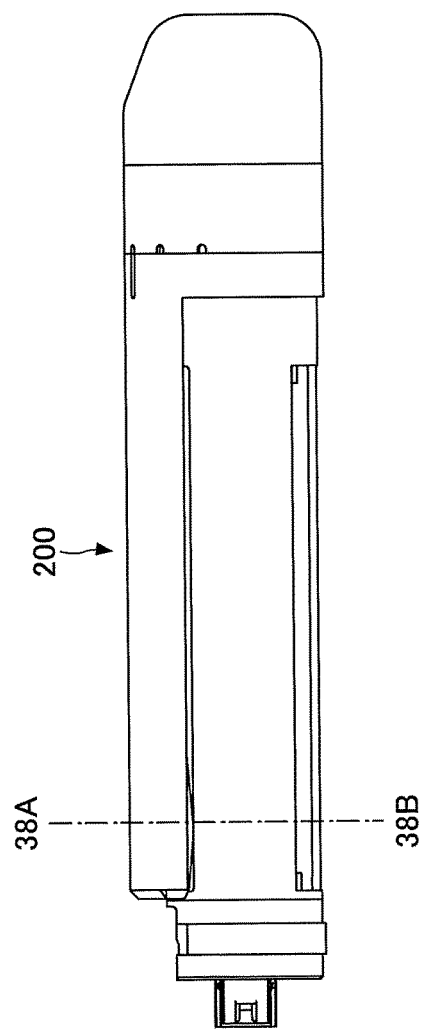
FIG. 38A and FIG. 38B are views for describing a sensor of the electronic device.
Figure 38B:
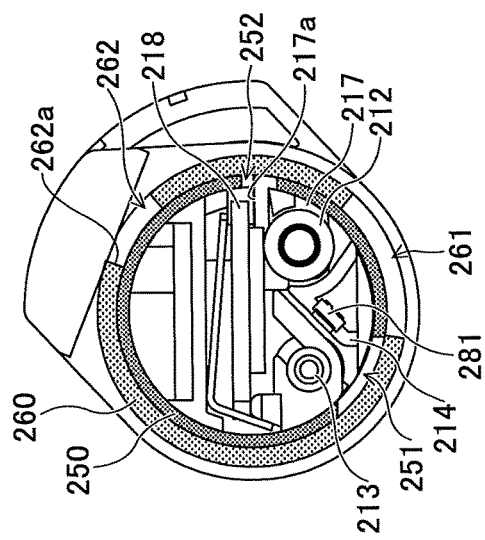

FIG. 38A illustrates the printer unit 200, and FIG. 38B is a cross-sectional view of the printer unit 200 taken along a chain line 38A-38B of FIG. 38A. As illustrated in FIG. 38B, a sensor 281 for detecting the recording paper is provided near the inner feeding port 251. The sensor 281 is provided at a position facing the feeding roller 213, and detects the recording paper that passes this position. Although not illustrated in the drawings, an ejecting paper sensor for detecting a paper being ejected may be similarly provided at a paper ejecting side.

FIG. 39A illustrates the printer unit 200, and FIG. 39B, FIG. 39C and FIG. 39D are cross-sectional views taken along a chain line 39A-39B of FIG. 39A. A sensor 284 is provided near the antenna 201. As illustrated in FIG. 39B to FIG. 39D, a position of the knob 270 is detected by the sensor 284. By detecting a position of a protrusion 274 provided inside the knob 270 by the sensor 284, whether the printer unit 200 is at the print mode or is at the other operation mode such as the standby mode or the communication mode can be detected. The wireless communication can be performed at the standby mode as illustrated in FIG. 39C. The sensor 284 is a reflection optical sensor, and is capable of detecting whether the printer unit 200 is in the print mode or other operation mode by detecting reflection light from the protrusion 274.

(Functional Blocks)

Next, functions of the electronic device 10 are described with reference to a block diagram illustrated in FIG. 40. The electronic device 10 includes a power block 30, a control block 50 and a printer block 20.

The power block 30 includes the battery 110, which is a lithium ion battery, the first switch 321, the second switch 322, the USB connector 330, the charging circuit 351, an AC power supply circuit 352 and a voltage switching circuit 353.

The control block 50 includes a control core 510, a motor drive circuit 511, a voltage detection circuit/fuse cut-out circuit 512, a print head drive circuit 513, a power source gate circuit 514, a retrigger timer 515, a temperature detection circuit 516, a first sensor circuit 517, a second sensor circuit 518, a third sensor circuit 519, the communication circuit 520, the antenna 201 and a reset circuit 523.

The printer block 20 includes the print head 211, the motor 230, the sensor 281, a cassette sensor 282 and a mode sensor 283.

As described above, the USB plug 700 or the AC adapter may be connected to the USB connector 330. The USB connector 330 is connected to the charging circuit 351 and the supply circuit 352. The charging circuit 351 is controlled by on-off operations of the first switch 321, and is connected to the switching circuit 353 and the control core 510. The supply circuit 352 is controlled by on-off operations of the second switch 322, and is connected to the switching circuit 353. The switching circuit 353 is connected to the control core 510.

The switching circuit 353 switches power supply to the control block 50 between a power supply from the battery 110 and a power supply from the AC adapter.

The control core 510 is connected to the drive circuit 511, the gate circuit 514, the retrigger timer 515, the detection circuit 516, the first sensor circuit 517, the second sensor circuit 518, the third sensor circuit 519, the communication circuit 520 and the reset circuit 523.

The drive circuit 511 is connected to the motor 230 to control the rotation of the motor 230. The detection circuit 512 detects abnormal voltage, and compulsively cut out fuses that are connected in series in an abnormal situation such as thermal runaway for ensuring safety. The detection circuit 512 is connected to a point between the control core 510 and the drive circuit 511, to the drive circuit 511, and to the motor 230.

The gate circuit 514 is connected to the drive circuit 513. The drive circuit 513 is connected to the print head 211 and drives and controls the print head 211 for performing printing by the print head 211.

The gate circuit 514 is provided for stopping the power supply to the print head 211 in the standby mode for preventing destruction of the print head 211 due to electric erosion.

The retrigger timer 515 is connected to the gate circuit 514, and prevents destruction of the print head 211 by runaway of the CPU or the like.

The detection circuit 516 is connected to the print head 211, detects temperature of the print head 211 based on information from a temperature sensor, not illustrated, provided at the print head 211, and sends the information regarding the temperature to the control core 510.

The sensor 281 for detecting the recording paper is provided inside the printer unit 200 as illustrated in FIG. 38B. Information detected by the sensor 281 is input to the control core 510 via the first sensor 517.

The sensor 282 for detecting the cassette 400 is provided in the mechanical unit 210. Information detected by the sensor 282 is input to the control core 510 via the second sensor circuit 518.

The mode sensor 283 for detecting the operation mode of the printer unit 200 based on the position of the knob 270 is provided in the sensor 284 of FIG. 39. Information detected by the mode sensor 283 is input in the control core 510 via the third sensor circuit 519.

The communication circuit 520 is connected to the antenna 201. When the antenna 201 receives information by the wireless communication, the information is input to the control core 510 via the communication circuit 520. Further, information is sent from the control core 510 via the communication circuit 520 by the antenna 201 by the wireless communication.

The reset circuit 523 is provided for resetting the control core 510 at the on and off operations of the power source to ensure activation of the control core 510.

(Source Voltage and Sensor)

Next, the sensor 281 is described. The sensor 281 is an optical sensor, and is explained as an optical sensor 610 illustrated in FIG. 41.

The optical sensor 610 includes a light-emitting portion including a light-emitting diode 611, and a light-receiving portion including a phototransistor 612 through which current flows when the light is received. If the recording paper exists, light reflected by the recording paper enters the phototransistor 612, and the optical sensor 610 detects the recording paper. If the recording paper does not exist, the light emitted from the light-emitting diode 611 is not reflected, and thus does not enter the phototransistor 612.

Figure 41:
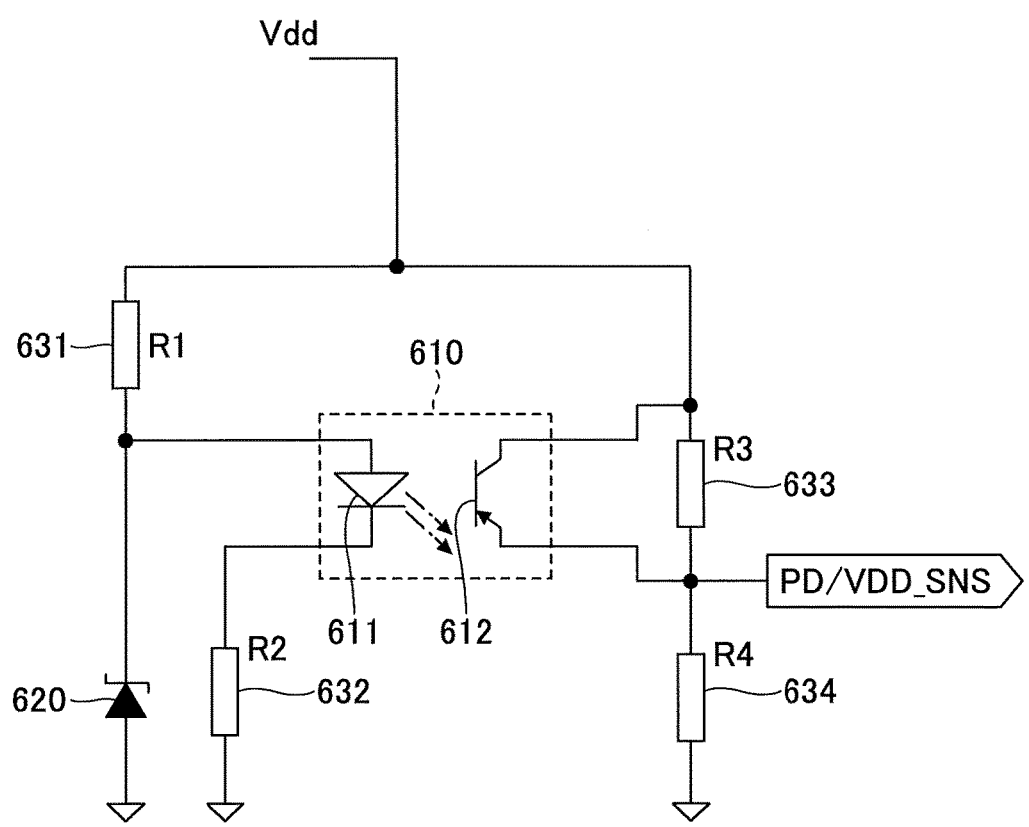
FIG. 41 is a circuit diagram for describing an optical sensor of the electronic device.

As illustrated in FIG. 41, the optical sensor 610 is formed in a circuit to which a Zener diode or resistors are connected. A source voltage Vdd is applied to the circuit.

In the circuit of FIG. 41, a Zener diode 620 and a first resistor 631 are connected in series. A cathode of the Zener diode 620 is connected to the first resistor 631, and an anode of the Zener diode 620 is grounded. The source voltage Vdd is applied to the first resistor 631. A connection portion of the cathode of the Zener diode 620 and the first resistor 631 is connected to an anode of the light-emitting diode 611. One terminal of a second resistor 632 is connected to a cathode of the light-emitting diode 611 and the other terminal of the second resistor 632 is grounded.

A third resistor 633 and a fourth resistor 634 are connected in series. The source voltage Vdd is applied to the third resistor 633, and the fourth resistor 634 is grounded. The source voltage Vdd is applied to a collector of the phototransistor 612, and an emitter of the phototransistor 612 is connected to a connection portion of the third resistor 633 and the fourth resistor 634. In this circuit, the existence of the recording paper is determined by detecting an electric potential between the third resistor 633 and the fourth resistor 634.

It is assumed that Zener voltage of the Zener diode 620 is 2 V, a difference ΔV in potential between the emitter and collector of the phototransistor 612 is 0.6 V, a resistance value of the first resistor 631 is "R1", a resistance value of the second resistor 632 is "R2", a resistance value of the third resistor 633 is "R3" and a resistance value of the fourth resistor 634 is "R4".

When the electronic device 10 is driven by the battery 110, the source voltage Vdd is 3 V. When the power is supplied via the AC power supply circuit 352, the source voltage Vdd is 5.5 V. By using the Zener diode 620 whose Zener voltage is 2 V, it is possible to flow current of a predetermined current value in the light-emitting diode 611 even when the source voltage Vdd is changed between 3 V and 5.5 V. Thus, a light amount emitted from the light-emitting diode 611 does not change.

When the recording paper exists, the light reflected by the recording paper enters the phototransistor 612 and current flows. In such a case, the current flows through the phototransistor 612 and the fourth resistor 634 in series, and a detected electric potential at the connection portion of the third resistor 633 and the fourth resistor 634 is Vdd−0.6 V.

When the recording paper does not exist, the light does not enter the phototransistor 612 and current does not flow. In such a case, current flows through the third resistor 633 and the fourth resistor 634 connected in series. Thus, an electric potential at the connection portion of the third resistor 633 and the fourth resistor 634 becomes a value obtained by resistively dividing the source voltage Vdd by the resistance value R3 and the resistance value R4, in other words, (Vdd×R4)/(R3+R4).

Thus, whether the recording paper exists between the light-emitting diode 611 and the phototransistor 612 can be determined by, setting a threshold of voltage between "Vdd−0.6 V" and (Vdd×R4)/(R3+R4), and determining whether a detected electric potential at the connection portion of the third resistor 633 and the fourth resistor 634 is higher than the threshold.

When the source voltage Vdd changes between 5.5 V and 3 V depending on the power source, the detected electric potential is also changed in accordance with the change of the source voltage Vdd. When the source voltage Vdd is changed, the recording paper may not be accurately detected. However, according to the electronic device 10 of the embodiment, such a problem does not occur by setting the resistance values of the resistors to be predetermined values, respectively.

When the resistance value R3 is 10 kΩ and the resistance value R4 is 20 kΩ, an electric potential detected when the source voltage Vdd is 5.5 V and the recording paper exists is 5.5 V−0.6 V=4.9 V as illustrated in Table 1. An electric potential detected when the recording paper does not exist is (5.5 V×20 kΩ)/(10 kΩ+20 kΩ)=3.7 V. Further, an electric potential detected when the source voltage Vdd is 3.0 V and the recording paper exists is 3.0 V−0.6 V=2.4 V. An electric potential detected when the recording paper does not exist is (3.0 V×20 kΩ)/(10 kΩ+20 kΩ)=2.0 V.

TABLE 1

| Vdd | NO PAPER | PAPER EXIST |
|---|---|---|
| 5.5 V | 3.7 V | 4.9 V |
| 3.0 V | 2.0 V | 2.4 V |

By setting a first threshold of 3.0 V, which is between 2.4 V and 3.7 V, for example, it is determined that the source voltage Vdd is 5.5 V when the detected electric potential is higher than the first threshold, and it is determined that the source voltage Vdd is 3.0 V when the detected electric potential is lower than the first threshold.

By setting a second threshold for a case when it is determined that the source voltage Vdd is 5.5 V, it is determined that the recording paper exists when the detected electric potential is higher than the second threshold. On the other hand, when the detected electric potential is lower than the second threshold, it is determined that the recording paper does not exist. The second threshold is set to be 4.3 V, for example.

By setting a third threshold for a case when it is determined that the source voltage Vdd is 3.0 V, it is determined that the recording paper exists when the detected electric potential is higher than the third threshold. On the other hand, when the detected electric potential is lower than the third threshold, it is determined that the recording paper does not exist. The third threshold is set to be 2.2 V, for example.

When the resistance value R3 is 10 kΩ, the resistance value R4 is 15 kΩ, and the source voltage Vdd is 5.5 V, a detected electric potential is 5.5 V−0.6 V=4.9 V as illustrated in Table 2 when the recording paper exists. When the recording paper does not exist, a detected electric potential is (5.5 V×15 kΩ)/(10 kΩ+15 kΩ)=3.3 V. Further, when the source voltage Vdd is 3.0 V, a detected electric potential is 3.0 V−0.6 V=2.4 V if the recording paper exists. When the recording paper does not exist, a detected electric potential is (3.0 V×15 kΩ)/(10 kΩ+15 kΩ)=1.8 V.

TABLE 2

| Vdd | NO PAPER | PAPER EXIST |
|---|---|---|
| 5.5 V | 3.3 V | 4.9 V |
| 3.0 V | 1.8 V | 2.4 V |

By setting a first threshold of 2.8 V, which is between 2.4 V and 3.3 V, for example, it is determined that the source voltage Vdd is 5.5 V when the detected electric potential is higher than the first threshold, and it is determined that the source voltage Vdd is 3.0 V when the detected electric potential is lower than the first threshold.

By setting a second threshold for a case when it is determined that the source voltage Vdd is 5.5 V, it is determined that the recording paper exists when the detected electric potential is higher than the second threshold. On the other hand, when the detected electric potential is lower than the second threshold, it is determined that the recording paper does not exist. The second threshold is set to be 4.1 V, for example.

By setting a third threshold for a case when it is determined that the source voltage Vdd is 3.0 V, it is determined that the recording paper exists when the detected electric potential is higher than the third threshold. On the other hand, when the detected electric potential is lower than the third threshold, it is determined that the recording paper does not exist. The third threshold is set to be 2.1 V, for example.

When assuming higher voltage of Vdd, 5.5 V, as VddH, and lower voltage of Vdd, 3.0 V, as VddL, a relationship VddL−ΔV<(VddH×R4)/(R3+R4) is satisfied. When assuming that "VddH" is 5.5 V, "VddL" is 3.0 V and "ΔV" is 0.6 V, the relationship becomes 3.0-0.6<(5.5×R4)/(R3+R4), and thus becomes R3<(3.1/2.4)×R4.

According to the electronic device 10, voltages are differentiated intentionally, that the voltage is 3.0 V when the electronic device 10 is driven by the battery 110, and the voltage is 5.5 V when the electronic device 10 is driven by the AC adapter. Whether the electronic device 10 is driven by the battery or by the AC adapter is determined by detecting the electric potential.

According to the electronic device of the disclosure, a small size electronic device easy to be carried and having a print function and a wireless communication function can be provided.

Although an embodiment of the electronic device has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

What is claimed is:

1. An electronic device comprising:
    a power unit that accommodates a battery;
    a communication unit that communicates with an external device; and
    a printer unit that prints print data obtained by the communication unit on a recording sheet,
    wherein the printer unit includes
        a mechanical unit,
        an inner cover that accommodates the mechanical unit, the inner cover including an inner feeding port for feeding the recording sheet and an inner ejecting port for ejecting the recording sheet, and
        an outer cover provided around the inner cover, the outer cover including an outer feeding port for feeding the recording sheet and an outer ejecting port for ejecting the recording sheet,
    wherein the inner cover is configured to rotate with respect to the outer cover.

2. The electronic device according to claim 1,
    wherein the printer unit is configured such that positions of the inner feeding port and the outer feeding port are matched and positions of the inner ejecting port and the outer ejecting port are matched by rotating the outer cover.

3. The electronic device according to claim 1, further comprising:
    a case provided between the printer unit and the power unit that is connected to the inner cover;
    a knob provided between the printer unit and the power unit that is configured to rotate with respect to the case; and
    a first switch that is configured to be pushed down by a rotation of the knob,
    wherein power supply to the printer unit is controlled by the rotation of the knob.

4. The electronic device according to claim 3, further comprising:
    a terminal for charging the battery,
    wherein the case and the knob are configured such that the terminal is exposed by the rotation of the knob.

5. The electronic device according to claim 1, wherein the mechanical unit includes
    a print head,
    a platen roller disposed to face the print head, and
    a feeding roller configured to feed the recording sheet fed from the inner feeding port toward the print head.

* * * * *